United States Patent
Imai

(10) Patent No.: US 12,050,183 B2
(45) Date of Patent: Jul. 30, 2024

(54) ABNORMALITY DETERMINATION DEVICE, ABNORMALITY DETERMINATION METHOD, AND PROGRAM STORAGE MEDIUM

(71) Applicant: NEC Corporation, Tokyo (JP)

(72) Inventor: Hiroshi Imai, Tokyo (JP)

(73) Assignee: NEC CORPORATION, Tokyo (JP)

(*) Notice: Subject to any disclaimer, the term of this patent is extended or adjusted under 35 U.S.C. 154(b) by 244 days.

(21) Appl. No.: 17/780,631

(22) PCT Filed: Dec. 4, 2019

(86) PCT No.: PCT/JP2019/047311
§ 371 (c)(1),
(2) Date: May 27, 2022

(87) PCT Pub. No.: WO2021/111533
PCT Pub. Date: Jun. 10, 2021

(65) Prior Publication Data
US 2023/0003664 A1    Jan. 5, 2023

(51) Int. Cl.
*G01N 21/89* (2006.01)
*G01N 21/88* (2006.01)
(Continued)

(52) U.S. Cl.
CPC ......... *G01N 21/89* (2013.01); *G01N 21/8851* (2013.01); *G06T 7/0002* (2013.01);
(Continued)

(58) Field of Classification Search
CPC ......... G01N 21/89; G06T 7/0002; G06T 7/20; G06V 10/24; G06V 10/761
See application file for complete search history.

(56) References Cited

U.S. PATENT DOCUMENTS 11,336,831 B2 * 5/2022 Asanuma ............. H04N 23/682

FOREIGN PATENT DOCUMENTS

| CN | 108460788 A | 8/2018 |
| CN | 109099852 A | 12/2018 |

(Continued)

OTHER PUBLICATIONS

International Search Report for PCT Application No. PCT/JP2019/047311, mailed on Feb. 18, 2020.

(Continued)

*Primary Examiner* — Hung V Nguyen
(74) *Attorney, Agent, or Firm* — Sughrue Mion, PLLC

(57) ABSTRACT

The coordinate system fixing unit uses the displacement of an object under measurement between photographed images in chronological order to generate fixed-coordinate chronological images. The displacement calculation unit uses the fixed-coordinate chronological images to calculate a two-dimensional spatial distribution of the displacement of the surface of the object under measurement. The displacement difference calculation unit calculates a two-dimensional displacement difference distribution by removing an error component from the two-dimensional spatial distribution. The depth movement amount calculation unit calculates a depth movement amount from the two-dimensional displacement difference distribution. The displacement separation unit calculates in-plane displacement from the two-dimensional displacement difference distribution. The determination unit uses the in-plane displacement and/or the depth movement amount to determine whether there is an abnormality in the object under measurement.

6 Claims, 23 Drawing Sheets

(51) Int. Cl.
  *G06T 7/00* (2017.01)
  *G06T 7/20* (2017.01)
  *G06V 10/24* (2022.01)
  *G06V 10/74* (2022.01)

(52) U.S. Cl.
  CPC .............. *G06T 7/20* (2013.01); *G06V 10/24* (2022.01); *G06V 10/761* (2022.01)

(56) References Cited

FOREIGN PATENT DOCUMENTS

| | | |
|---|---|---|
| JP | 2007-121126 A | 5/2007 |
| JP | 2009-198452 A | 9/2009 |
| JP | 2017-090145 A | 5/2017 |
| KR | 2014-0000612 A | 1/2014 |
| WO | 2016/152075 A1 | 9/2016 |
| WO | 2016/152076 A1 | 9/2016 |

OTHER PUBLICATIONS

English translation of Written opinion for PCT Application No. PCT/JP2019/047311, mailed on Feb. 18, 2020.

Hyoseong Lee et al., "Measurement of 3-D vibration by dynamic photogrammetry using least-square image matching for sub-pixel targeting", IEEE (Institute of Electrical and Electronics Engineers), 2015.

Jan Winstroth et al., "Wind turbine rotor blade monitoring using digital image correlation: Assessment on a scaled model", 32nd ASME (American Society of Mechanical Engineers) Wind Energy Symposium, 2014, pp. 932-947.

Huang et al., "Application of Image Analysis and Time-Frequency Analysis for Tracking the Rotating Blades Vibration", Proc. of SPIE, 2014, vol. 9061, 906111, in particular, Abstract.

Zhang et al., "Monitoring the Rotation Status of Wind Turbine Blades Using High-speed Camera System", Proc. of SPIE, 2013, vol. 8769, 876916, in particular, Abstract.

* cited by examiner

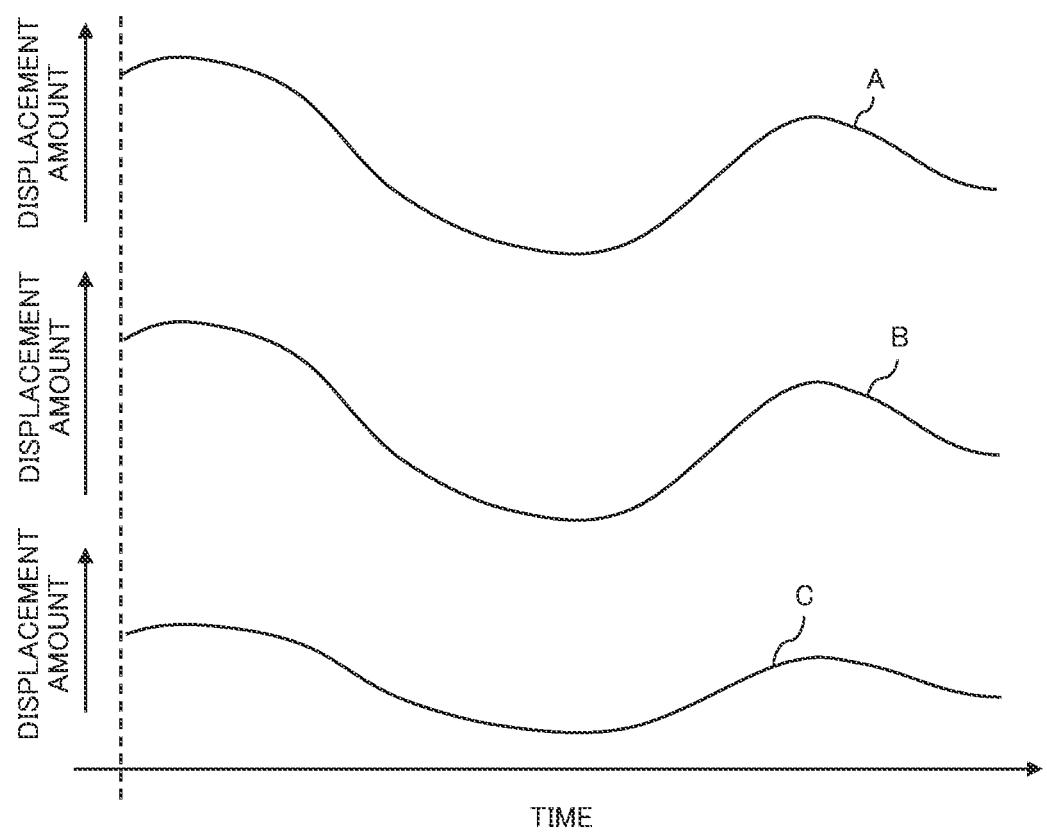

ABNORMALITY DETERMINATION DEVICE, ABNORMALITY DETERMINATION METHOD, AND PROGRAM STORAGE MEDIUM

This application is a National Stage Entry of PCT/JP2019/047311 filed on Dec. 4, 2019, the contents of all of which are incorporated herein by reference, in their entirety.

TECHNICAL FIELD

The present invention relates to a technique for remotely measuring r a displacement on a surface of an object performing a motion such as movement or rotation and determining an abnormality of the object.

BACKGROUND ART

If a defect such as surface cracking or peeling or an internal cavity occurs in an object (hereinafter also referred to as a moving object) that performs a motion such as movement or rotation, such as a propeller of wind power generation, a blade of a turbine, or a wheel of a traveling vehicle, soundness of a structure including the moving object may be adversely affected. Therefore, it is necessary to accurately detect these defects as abnormalities as soon as possible.

As a method of inspecting the moving object, there is a method of detecting an abnormality of the moving object by stopping the motion of the moving object and performing a visual inspection or a noise inspection by an inspector. This method requires significant human costs and has a problem that the structure including the moving object cannot be used during the inspection.

Therefore, a method of determining a state of the moving object without stopping the motion of the moving object on the basis of an image of the moving object has been developed. For example, in the techniques disclosed in NPLs 1 and 2, a moving image of a moving object is captured by a stereo camera, motions of a plurality of points in the moving object are obtained from time-series frame images constituting the moving image, and an abnormality of the moving object is detected.

Further, in the techniques in PTLs 1 and 2, a displacement amount (also referred to as in-plane displacement) in a direction along a surface of a moving object and a displacement amount (also referred to as out-of-plane displacement) in a direction along an optical axis direction of a camera are detected from a moving image by a single camera instead of a stereo camera. Moreover, in the techniques in PTLs 1 and 2, defects (abnormalities) of the moving object such as cracking, peeling, and an internal cavity are detected on the basis of the detected out-of-plane displacement and in-plane displacement.

PTL 3 discloses a technique of irradiating a three-dimensional structure with laser light and acquiring shape data of a three-dimensional structure using reflected light of laser light from the three-dimensional structure.

CITATION LIST

Patent Literature

[PTL 1] WO 2016/152075 A1
[PTL 2] WO 2016/152076 A1
[PTL 3] JP 2007-121126 A

Non Patent Literature

[NPL 1] Hyoseong Lee et al., "Measurement of 3-D vibration by dynamic photogrammetry using least-square image matching for sub-pixel targeting", IEEE (Institute of Electrical and Electronics Engineers), 2015
[NPL 2] Jan Winstroth and Joerg R. Seume, "Wind turbine rotor blade monitoring using digital image correlation: Assessment on a scaled model", 32nd ASME (American Society of Mechanical Engineers) Wind Energy Symposium, 2014

SUMMARY OF INVENTION

Technical Problem

The techniques described in NPLs 1 and 2 need to capture the moving image using the stereo camera and have a problem that the device increases in size due to the size of the stereo camera. On the other hand, the techniques described in PTLs 1 and 2 use only one camera, and can suppress an increase in size as compared with the stereo camera, so that the problem of an increase in size of the device caused by the stereo camera is prevented.

However, in the techniques described in PTLs 1 and 2, when the out-of-plane displacement and the in-plane displacement in the moving object during the motion are measured, a value obtained by adding a displacement due to the motion of the moving object to the out-of-plane displacement and the in-plane displacement is detected as a measured value. As a result, characteristics appearing in the out-of-plane displacement and the in-plane displacement due to the abnormality of the moving object become difficult to be captured from the measured value, and this causes a problem that the detection accuracy of the abnormality of the moving object is lowered.

The present invention has been made in view of the above problems, and a main object thereof is to enable accurate detection of an abnormality of a moving object in a non-contact manner while suppressing an increase in size of a device.

Solution to Problem

To achieve the above object, an abnormality determination device according to the present invention includes, as one aspect:

a coordinate system fixing unit configured to generate coordinate-fixed time-series images in which positions and directions of images of a surface of an object to be measured in a plurality of captured images are aligned by changing directions of the plurality of captured images in a direction in which reference points in the captured images determined based on the image of the surface of the object to be measured coincide with each other in the captured images in time-series images including the plurality of captured images in which the surface of the object to be measured is captured with passage of time;

a displacement calculation unit configured to calculate a two-dimensional spatial distribution of displacements of the surface of the object to be measured from the coordinate-fixed time-series images;

a displacement difference calculation unit configured to calculate a two-dimensional displacement difference distribution representing differences between the displacements of the surface of the object to be measured in the calculated two-dimensional spatial distribution and a displacement selected as a reference from the displacements of the surface of the object to be measured in the two-dimensional spatial distribution;

a depth movement amount calculation unit configured to calculate, as a depth movement amount, a movement amount of the surface of the object to be measured in a normal direction orthogonal to the image of the surface of the object to be measured from the two-dimensional displacement difference distribution;

a displacement separation unit configured to calculate a displacement amount on the surface of the object to be measured as an in-plane displacement by subtracting the depth movement amount from the two-dimensional displacement difference distribution; and a determination unit configured to determine an abnormality of the object to be measured using one or both of the in-plane displacement and the depth movement amount.

Further, an abnormality determination method according to the present invention includes, as one aspect:

generating coordinate-fixed time-series images in which positions and directions of images of a surface of an object to be measured in a plurality of captured images are aligned by changing directions of the plurality of captured images in a direction in which reference points in the captured images determined based on the image of the surface of the object to be measured coincide with each other in the captured images in time-series images including the plurality of captured images in which the surface of the object to be measured is captured with passage of time;

calculating a two-dimensional spatial distribution of displacements of the surface of the object to be measured from the coordinate-fixed time-series images;

calculating a two-dimensional displacement difference distribution representing differences between the displacements of the surface of the object to be measured in the calculated two-dimensional spatial distribution and a displacement selected as a reference from the displacements of the surface of the object to be measured in the two-dimensional spatial distribution;

calculating, as a depth movement amount, a movement amount of the surface of the object to be measured in a normal direction orthogonal to the image of the surface of the object to be measured from the two-dimensional displacement difference distribution;

calculating a displacement amount on the surface of the object to be measured as an in-plane displacement by subtracting the depth movement amount from the two-dimensional displacement difference distribution; and determining an abnormality of the object to be measured using one or both of the in-plane displacement and the depth movement amount.

Moreover, a program storage medium according to the present invention stores, as one aspect, a computer program for causing a computer to execute:

processing of generating coordinate-fixed time-series images in which positions and directions of images of a surface of an object to be measured in a plurality of captured images are aligned by changing directions of the plurality of captured images in a direction in which reference points in the captured images determined based on the image of the surface of the object to be measured coincide with each other in the captured images in time-series images including the plurality of captured images in which the surface of the object to be measured is captured with passage of time;

processing of calculating a two-dimensional spatial distribution of displacements of the surface of the object to be measured from the coordinate-fixed time-series images;

processing of calculating a two-dimensional displacement difference distribution representing differences between the displacements of the surface of the object to be measured in the calculated two-dimensional spatial distribution and a displacement selected as a reference from the displacements of the surface of the object to be measured in the two-dimensional spatial distribution;

processing of calculating, as a depth movement amount, a movement amount of the surface of the object to be measured in a normal direction orthogonal to the image of the surface of the object to be measured from the two-dimensional displacement difference distribution;

processing of calculating a displacement amount on the surface of the object to be measured as an in-plane displacement by subtracting the depth movement amount from the two-dimensional displacement difference distribution; and processing of determining an abnormality of the object to be measured using one or both of the in-plane displacement and the depth movement amount.

Advantageous Effects of Invention

According to the present invention, it is possible to accurately detect an abnormality of a moving object in a non-contact manner while suppressing an increase in size of a device.

BRIEF DESCRIPTION OF DRAWINGS

FIG. 5B is a graph illustrating a temporal change example in which an error component in the displacement of the surface of the object to be measured is removed.

EXAMPLE EMBODIMENT

Hereinafter, example embodiments according to the present invention will be described with reference to the drawings. Note that any of the example embodiments to be described below does not limit the scope of the present invention.

First Example Embodiment

Figure 1A:
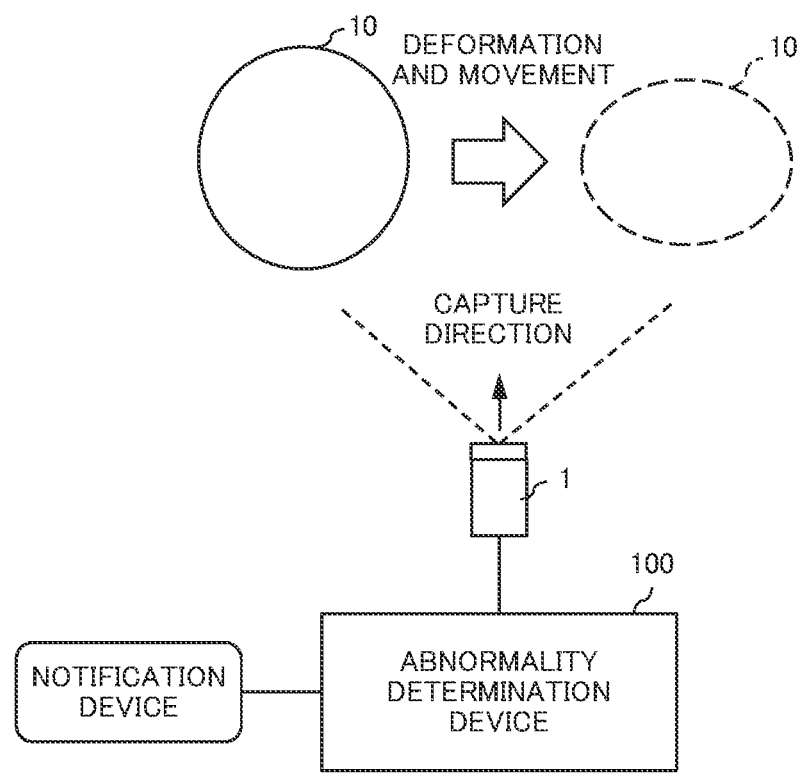
FIG. 1A is a diagram for describing a configuration to determine an abnormality of an object to be measured using an abnormality determination device according to a first example embodiment of the present invention.

FIG. 1A is a diagram for describing a configuration to determine an abnormality of an object to be measured using an abnormality determination device according to a first example embodiment of the present invention. An abnormality determination device 100 according to the first example embodiment is connected to a capture device 1 and has a function to receive an image captured by the capture device 1 from the capture device 1.

The capture device 1 has a function to capture a moving image, and generates time-series frame images (hereinafter, referred to as time-series images) by capturing a moving image of a surface of an object to be measured 10 as a target to be captured in the first example embodiment. That is, the time-series images include a plurality of frame images. A frame rate of the time-series images is, for example, 400 frames per second (fps). Here, the object to be measured 10 is a moving object that performs a motion such as movement or rotation, and the frame rate of the time-series images is appropriately set in consideration of a natural frequency of the object to be measured 10 and is not limited to 400 fps.

The abnormality determination device 100 has a function to calculate displacement on a captured surface of the object to be measured 10, using a difference of the surface of the object to be measured 10 between the frame images in the time-series images generated by the capture device 1. The abnormality determination device 100 is, for example, an information device (signal processing device) such as a personal computer (PC) or a server.

Figure 1B:
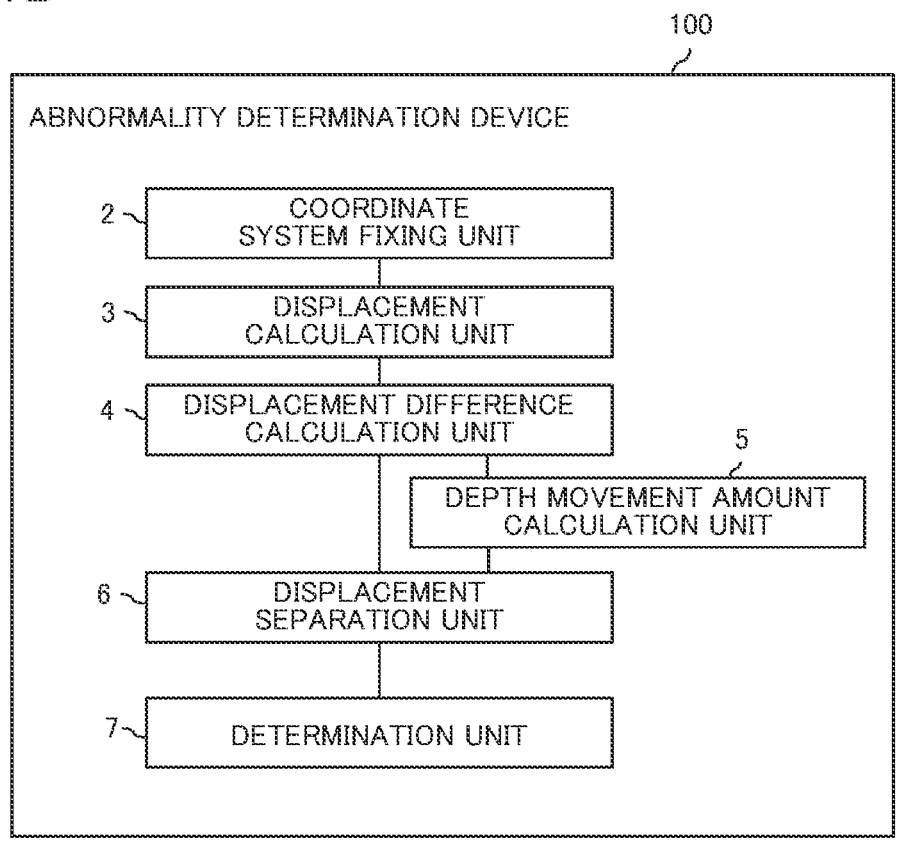
FIG. 1B is a block diagram for describing a functional configuration of the abnormality determination device according to the first example embodiment.
Figure 1C:
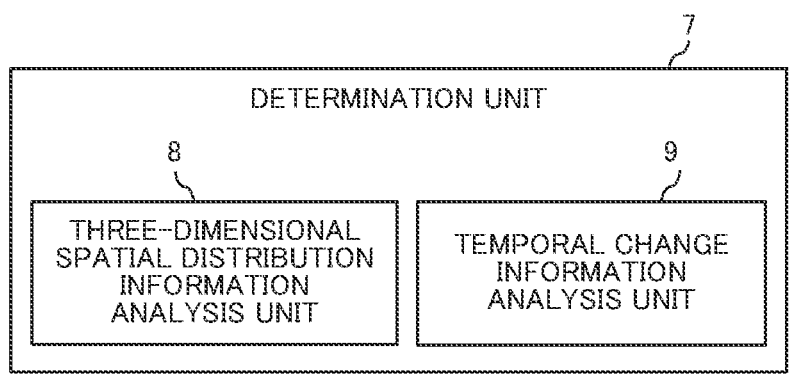
FIG. 1C is a block diagram illustrating an example of a functional configuration of a determination unit in the abnormality determination device according to the first example embodiment.

In the first example embodiment, as illustrated in FIG. 1B, the abnormality determination device 100 includes, as functional units, a coordinate system fixing unit 2, a displacement calculation unit 3, a displacement difference calculation unit 4, a depth movement amount calculation unit 5, a displacement separation unit 6, and a determination unit 7. As illustrated in FIG. 1C, the determination unit 7 includes a three-dimensional spatial distribution information analysis unit 8 and a temporal change information analysis unit 9. Each functional unit of the abnormality determination device 100 is implemented by a central processing unit (CPU), which is a calculation resource included in the information device, executing a computer program (hereinafter also referred to as a program) stored in a memory or a hard disk drive (HDD), which is a storage resource.

The coordinate system fixing unit 2 in the abnormality determination device 100 has a function to receive the time-series images from the capture device 1 and generate coordinate-fixed time-series images using the plurality of frame images (captured images) of the received time-series images. The coordinate-fixed time-series images are time-series images as follows. Here, it is assumed that a reference point set in the frame image defined as a reference among the plurality of frame images of the time-series images is displaced in accordance with the displacement due to the motion of the object to be measured 10 in the plurality of time-series frame images. The time-series frame images in which directions of the frame images are rotated or displaced so that positions of the reference points in the time-series frame images coincide with one another are referred to as coordinate-fixed time-series images.

Figure 2A:
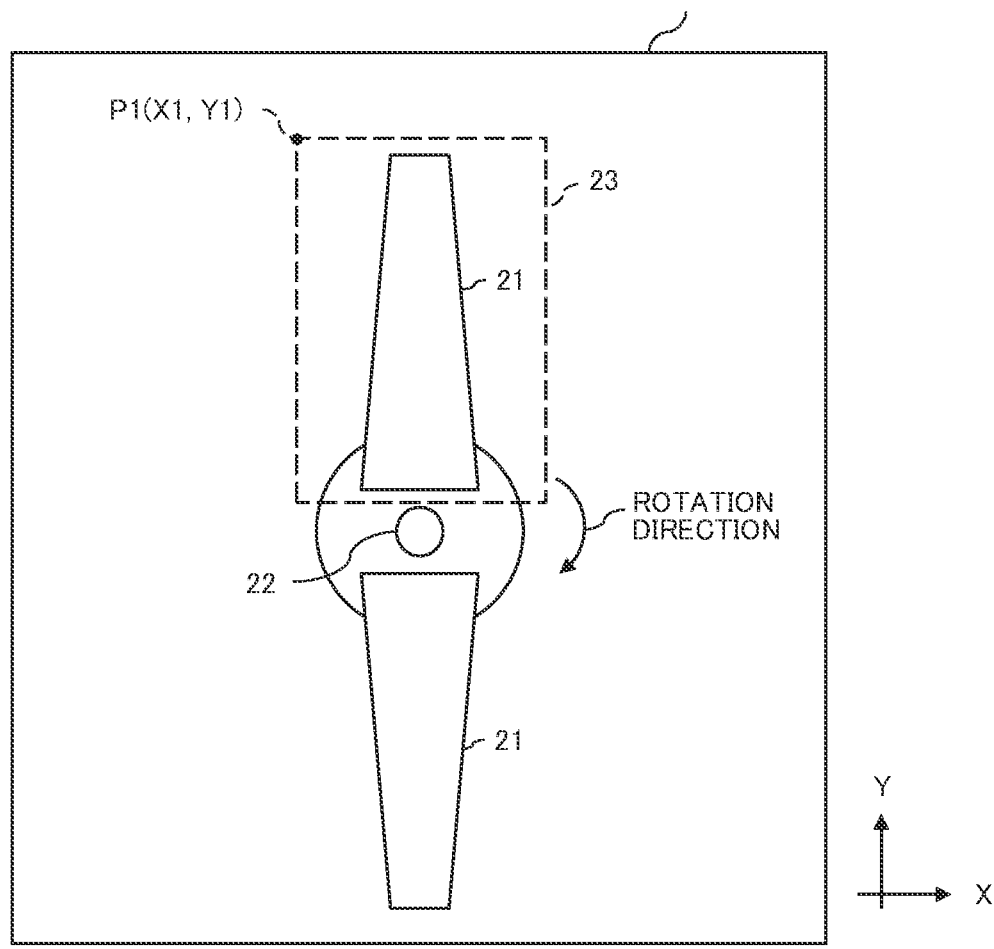
FIG. 2A is a diagram for describing a function of a coordinate system fixing unit that is one of functional units included in the abnormality determination device of the first example embodiment.
Figure 2B:
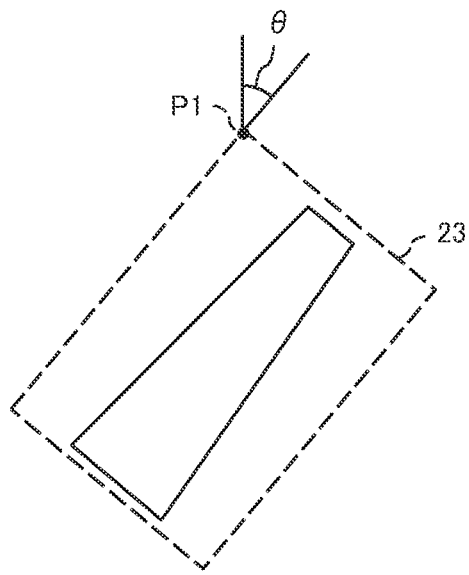
FIG. 2B is a diagram for describing a function of the coordinate system fixing unit together with FIG. 2A.
Figure 2C:
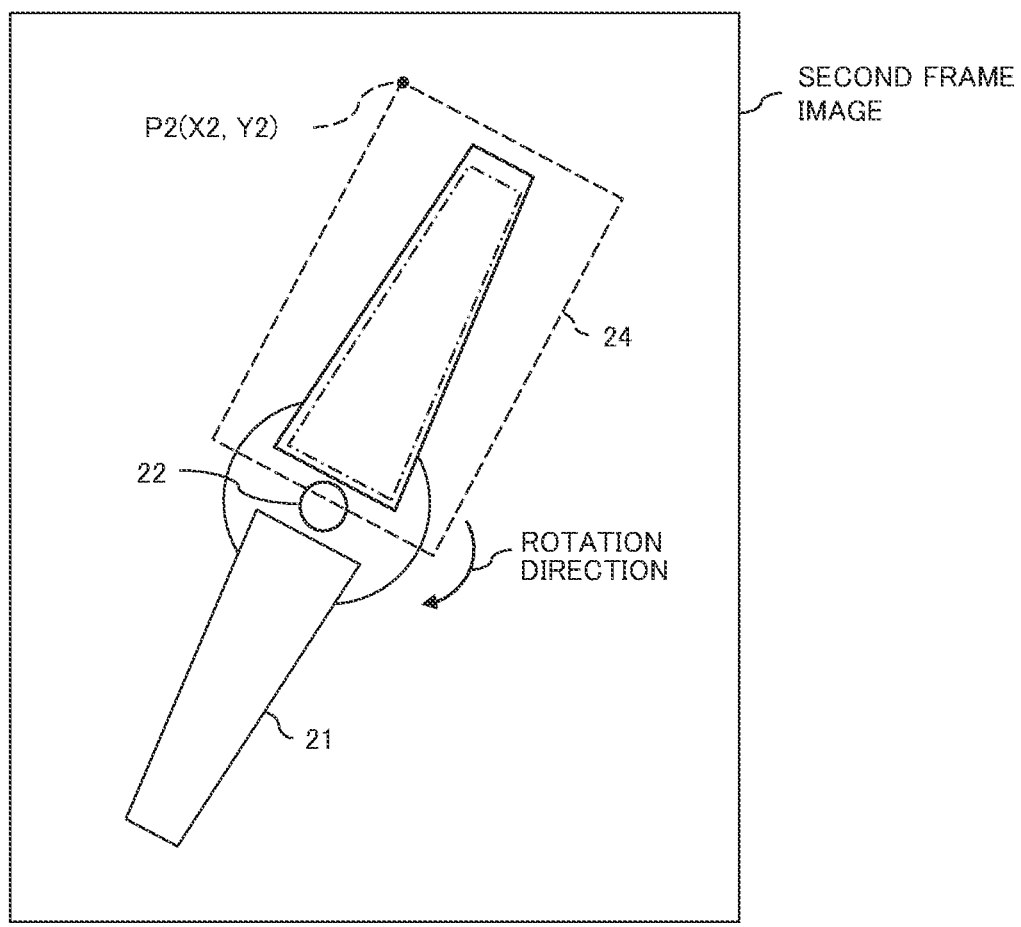
FIG. 2C is a diagram for describing the function of the coordinate system fixing unit together with FIGS. 2A and 2B.

FIGS. 2A, 2B, and 2C are diagrams for describing the function of the coordinate system fixing unit 2 using a specific example. In this specific example, the object to be measured 10 is one propeller-like blade (object to be measured) 21 that rotates about a rotation shaft 22 as illustrated in FIG. 2A. In addition, it is assumed that a selection region 23 is set in the first frame image illustrated in FIG. 2A defined as a reference in the time-series images. The selection region 23 is a region including an image of the object to be measured 21. In this example, the selection region 23 has a rectangular shape, and one corner P1 of the rectangular shape is set as the reference point. Moreover, coordinates representing a position on the frame image are represented using a two-dimensional orthogonal coordinate system including an X axis and a Y axis orthogonal to each other, and the coordinates of the reference point P1 in the first frame image are represented as (X1, Y1).

FIG. 2B is obtained by rotating the selection region 23 in FIG. 2A by an angle θ about the reference point P1. FIG. 2C illustrates the second frame image captured at a later time than the first frame image in the time-series images including the first frame image.

The coordinate system fixing unit 2 compares each image of the selection region 23 rotated by the angle θ in FIG. 2B from 0° to 360° with 1° increments with, for example, the second frame image in FIG. 2C, and calculates a correlation value between the compared images (similarity of the images) by an image correlation method. Further, the coordinate system fixing unit 2 acquires the value of the angle θ (hereinafter also referred to as a similarity large angle θm) at which the correlation value is maximized by the calculation processing of the correlation value. In addition, the coordinate system fixing unit 2 acquires the coordinates of the position of the reference point P1 in the case where the image of the selection region 23 is superimposed on the second frame image so that the correlation value is maximized. That is, the selection region 23 superimposed on the second frame image so as to maximize the correlation value is represented as a region 24 by the dotted line in FIG. 2C, and the coordinates of the position P2 corresponding to the reference point P1 of the selection region 23 are represented as (X2, Y2).

Note that, for example, affine transformation is used for image rotation, and the increment of the rotation angle may be appropriately set according to required accuracy or calculation cost (processing amount), and is not limited to the increment of 1°. Further, as a method of calculating the similarity between images, a method other than the image correlation method may be used. Moreover, image interpolation processing may be performed in the image rotation. Furthermore, in the processing of calculating the similarity between images and the processing of image rotation, the coordinate system fixing unit 2 may have a function to select a processing method according to the calculation cost calculated in consideration of a resolution of the image or the like.

Figure 3A:
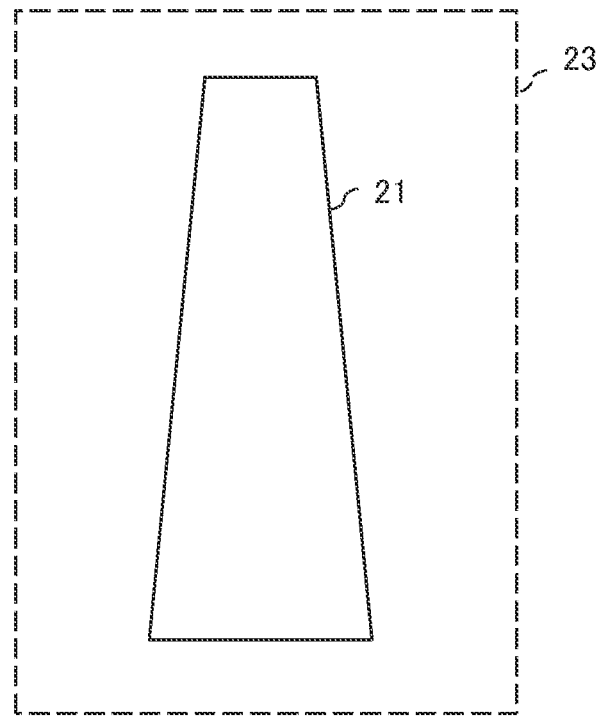
FIG. 3A is a diagram used for describing a method of generating a coordinate-fixed time-series image.
Figure 3B:
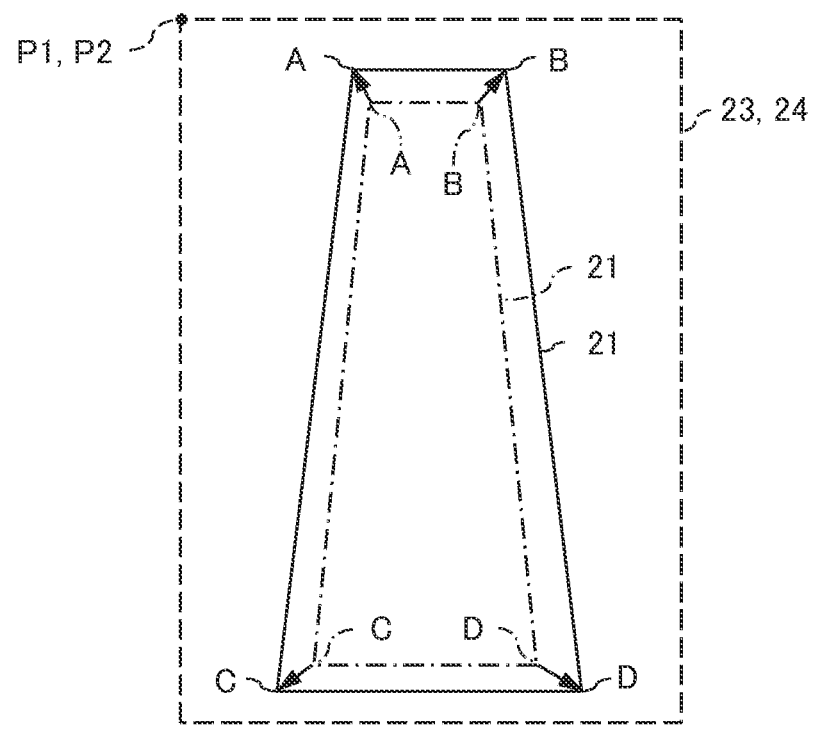
FIG. 3B is a diagram illustrating an example of the coordinate-fixed time-series image.

FIGS. 3A and 3B are diagrams for describing coordinate-fixed time-series images.

FIG. 3A is an image corresponding to the selection region 23 in FIG. 2A. FIG. 3B is an image obtained by rotating the region 24 in FIG. 2C by the similarity large angle θm in a direction to match the direction of the selection region 23 (in other words, a reverse direction to the direction in which the image of the selection region 23 is displaced from the state of FIG. 2A to the state of FIG. 2C). The solid line in FIG. 3B indicates an image (blade image) of the object to be measured 21 displayed in the region 24 in the second frame image. The alternate long and short dash line indicates an image of the object to be measured 21 displayed in the selection region 23 in the first frame image (an image of the blade (an image corresponding to the image of the object to be measured 21 illustrated in FIG. 3A)). In FIG. 3B, the images of the regions 23 and 24 are superimposed such that the position of the reference point P1 set in the selection region 23 in FIG. 2A coincides with the position of the point P2 corresponding to the reference point P1 in the region 24 in FIG. 2C.

In each frame image in the time-series images or in a plurality of frame images selected from the time-series images, the processing of displacing (rotating) the frame images and the processing of superimposing the frame images are executed in a similar manner to described above to generate a coordinate-fixed time-series image.

Figure 4:
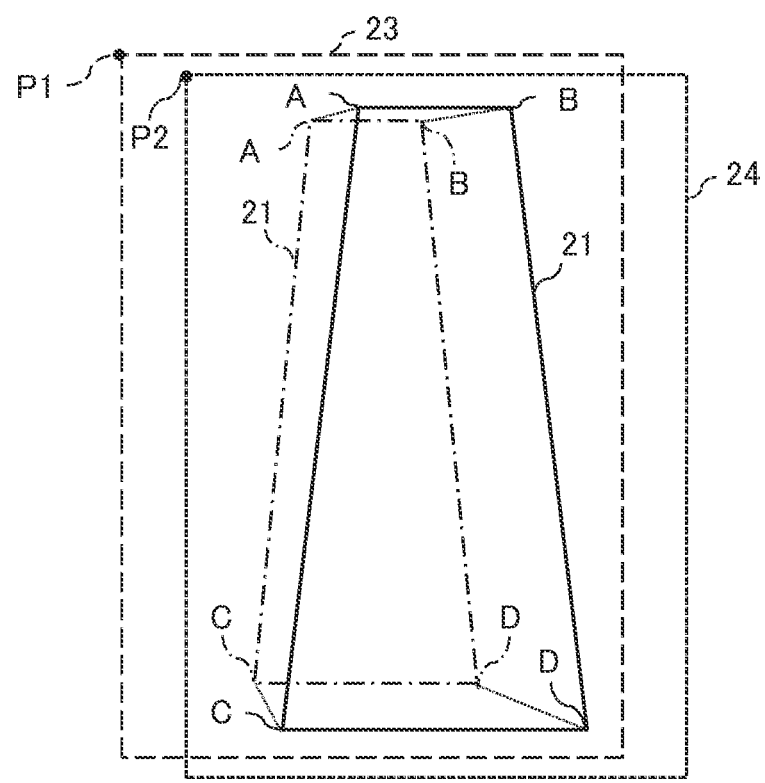
FIG. 4 is a diagram for describing a defective coordinate-fixed state.

As described above, the state as illustrated in FIG. 3B in which the frame images are superimposed such that the reference point P1 set in the reference frame image coincides with the point corresponding to the reference point P1 in another frame image is referred to as a good coordinate-fixed state. On the other hand, a state in which the frame images are superimposed such that the reference point P1 set in the reference frame image shifts from the point corresponding to the reference point P1 in another frame image is referred to as a non-good (defective) coordinate-fixed state. An example of a defective coordinate-fixed state is illustrated in FIG. 4.

As illustrated in FIG. 3B, there is a case where the images are displayed in a shifted manner although the images of the same object to be measured 21 are superimposed and displayed in the good coordinate-fixed state. This image shift is caused by deformation of the object to be measured 21 itself. Further, as illustrated in FIG. 4, the image shift generated in the case where the images of the same object to be measured 21 are superimposed and displayed in the defective coordinate-fixed state is caused by not only the deformation of the object to be measured 21 itself but also the defective coordinate-fixed state (shift of the reference point).

The displacement calculation unit 3 has a function to calculate a two-dimensional spatial distribution of displacements of the surface of the object to be measured from the coordinate-fixed time-series images. In the first example embodiment, the displacement calculation unit 3 has a function to calculate a displacement amount of the image in the coordinate-fixed time-series image generated by the coordinate system fixing unit 2.

The displacement amount of the image in the coordinate-fixed time-series image will be described with a specific example. The image of the object to be measured 21 illustrated in the coordinate-fixed time-series image in FIG. 3B has a quadrangular shape, and here, the four corners are represented as A, B, C, and D, respectively. When the images of the plurality of objects to be measured illustrated in the coordinate-fixed time-series images are arranged in time series, the image of the object to be measured repeats enlargement and reduction according to the displacement (motion or rotation) of the object to be measured. As a result, when the corners A, B, C, and D of the image of the object to be measured as illustrated in FIG. 3B are traced in time series in the coordinate-fixed time-series images, the corners A to D are displaced.

Figure 5A:
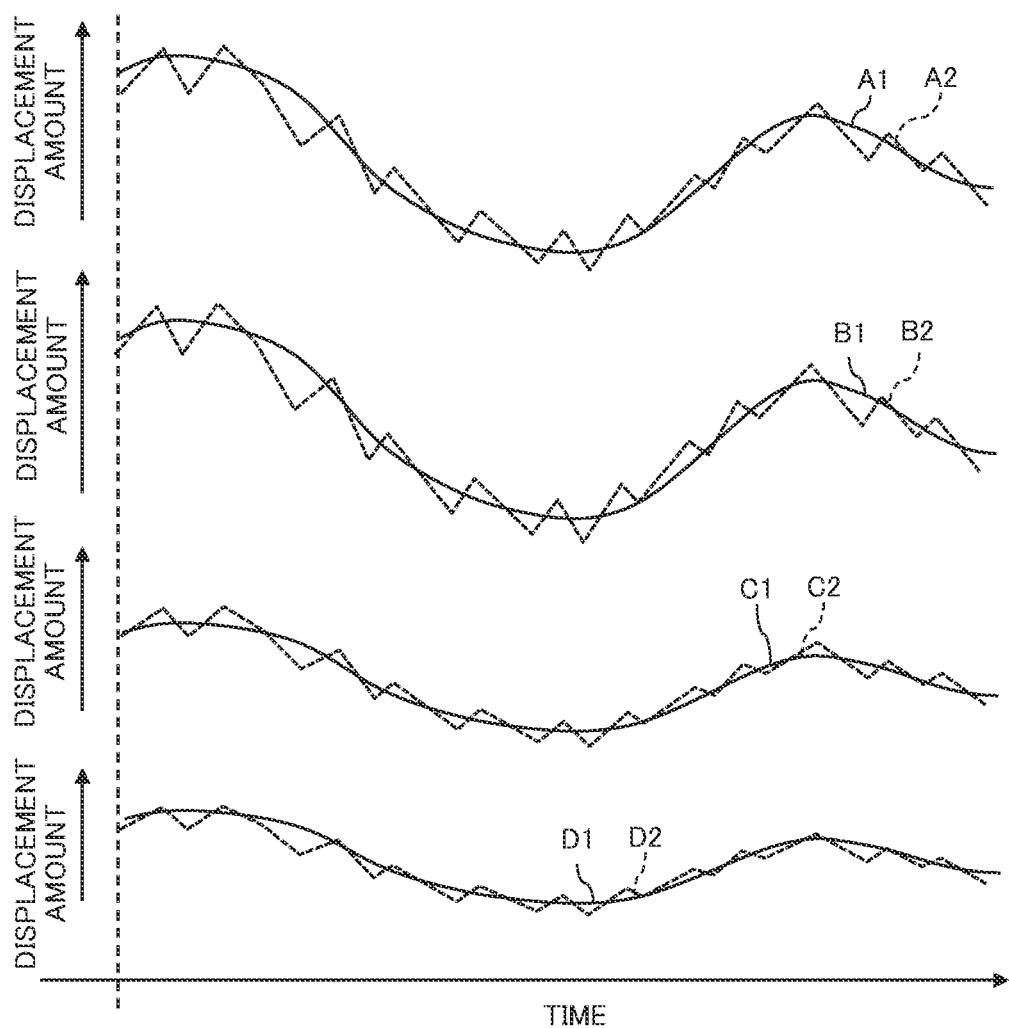
FIG. 5A is a graph illustrating a temporal change example of displacement of a surface of an object to be measured obtained from a captured image.

FIG. 5A illustrates, in time series, an example of displacement amounts (displacement in the Y direction) of the corners A to D with reference to the positions of the corners A to D in the image of the object to be measured 21 defined as a reference in the coordinate-fixed time-series images. In the case where the coordinate-fixed time-series images are in a good coordinate-fixed state, the displacements of the corners A to D show the temporal changes as illustrated by the solid lines A1 to D1 in FIG. 5A. In the case where the coordinate-fixed time-series images are in a defective coordinate-fixed state, the displacements of the corners A to D show the temporal changes as illustrated by the dotted lines A2 to D2 in FIG. 5A. The displacements of the corners A to D illustrated by the dotted lines A2 to D2 are displacements obtained by adding an error component caused by the defective coordinate-fixed state to the displacements of the corners A to D illustrated by the solid lines A1 to D1.

The displacement calculation unit 3 calculates the displacement amount of the image in the coordinate-fixed time-series image generated by the coordinate system fixing unit 2 by, for example, comparing the reference image of the object to be measured 21 with another image of the object to be measured 21 captured at a different capture time. The displacement calculation unit 3 may calculate the displacement of not the corner but the surface (blade surface) of the object to be measured 21 by calculating correlation between the frame images in the time-series images by the image correlation method. Further, in the case of calculating correlation between the frame images as the displacement amount using the image correlation method, the displacement calculation unit 3 can calculate the displacement amount at 1/100 level of a pixel pitch of an optical element in the capture device 1 by further using a quadratic curve interpolation method. Moreover, the displacement calculation unit 3 may generate a displacement distribution diagram in the two-dimensional space on the basis of the calculated displacement amount. Moreover, in a case where a normal direction of the surface of the object to be measured is inclined with respect to an optical axis of a lens of the capture device 1, the displacement calculation unit 3 may calculate the displacement amount in which the inclination of the normal direction of the surface of the object to be measured with respect to the optical axis of the lens of the capture device 1 is corrected by executing perspective projection conversion processing.

The displacement difference calculation unit 4 has a function to remove the error component caused by the defective coordinate-fixed state from the displacement amount calculated by the displacement calculation unit 3. As a specific example, the displacement difference calculation unit 4 subtracts the displacement amount of the corner D from the displacement amounts of the corners A to C of the object to be measured 21 calculated by the displacement calculation unit 3. Here, it is assumed that the deformation of the object to be measured itself during the motion of the object to be measured is sufficiently smaller than the magnitude of the error component caused by the defective coordinate-fixed state, and the object to be measured can be regarded as a rigid body. The error components caused by the defective coordinate-fixed state included in the displacement amounts of the corners A to D are similar. As a result, by subtracting the displacement amount of the corner D from the displacement amounts of the corners A to C, the displacement amounts of the corners A to C in which the error component caused by the defective coordinate-fixed state has been removed, as illustrated in FIG. 5B, are calculated. That is, the displacement difference calculation unit 4 calculates the two-dimensional displacement difference distribution representing differences between the displacements of the surface of the object to be measured in the two-dimensional spatial distribution calculated by the displacement calculation unit 3 and the displacement selected as a reference from the displacements of the surface of the object to be measured in the two-dimensional spatial distribution.

Figure 6A:
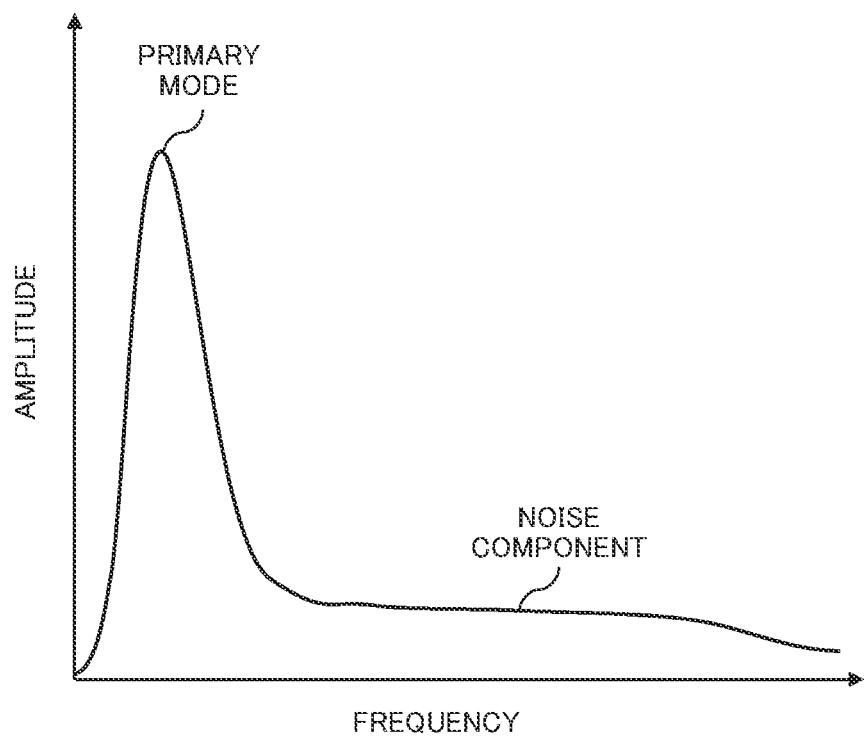
FIG. 6A is a graph illustrating an example of frequency characteristics of vibration of the object to be measured calculated using a captured image.

The displacement amount in which the error component caused by the defective coordinate-fixed state has been removed is obtained by the displacement difference calculation unit 4, so that evaluation performance of a vibration state of the object to be measured 21 can be improved as follows. That is, since the object to be measured 21 illustrated in FIG. 2A is a propeller-like blade and has a cantilever shape, the object to be measured naturally vibrates at a frequency corresponding to its size and material. Amplitude of a higher order natural vibration mode is smaller than the vibration of a primary natural vibration mode (fundamental mode). Therefore, in the case where the displacement amount calculated by the displacement calculation unit 3 includes the error component caused by the defective coordinate-fixed state, the frequency characteristic of the vibration of the object to be measured 21 obtained using the displacement amount calculated by the displacement calculation unit 3 is illustrated as in FIG. 6A. That is, FIG. 6A is a graph illustrating the frequency characteristic of vibration at the corner A of the object to be measured 21 illustrated in FIG. 3B, the frequency characteristic being obtained on the basis of the displacement amount calculated by the displacement calculation unit 3. In FIG. 6A, the vibration at the natural frequency of the primary natural vibration mode of the object to be measured 21 appears, but the vibration of the higher order natural vibration mode is buried in a noise component due to the error component caused by the defective coordinate-fixed state and does not appear.

Figure 6B:
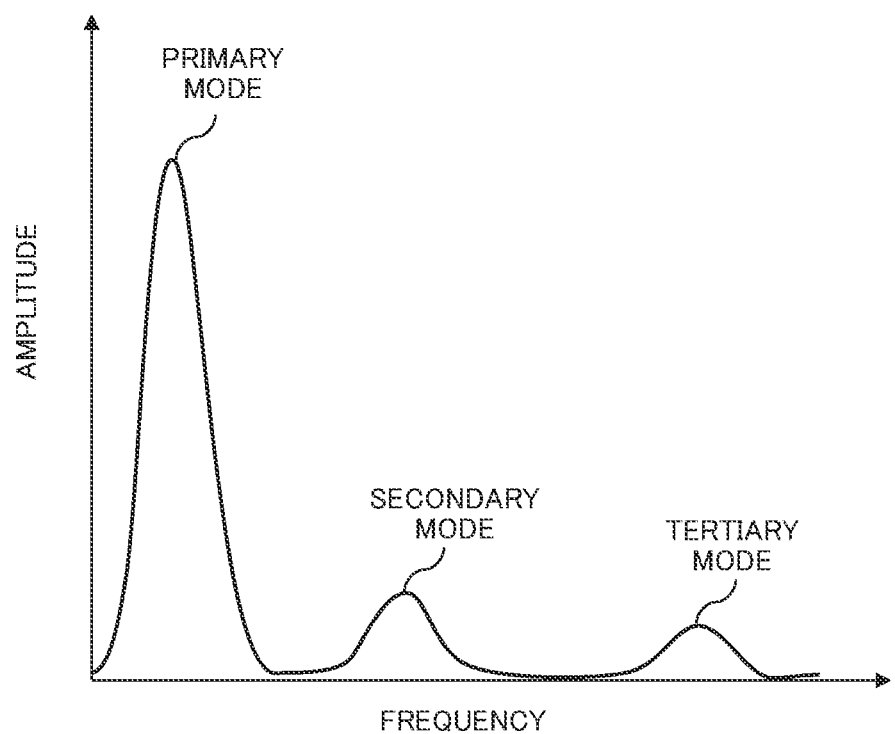
FIG. 6B is a diagram illustrating an example of frequency characteristics of vibration of the object to be measured.

In contrast, by using the displacement amount in which the error component caused by the defective coordinate-fixed state has been removed by displacement difference calculation unit 4, the frequency characteristic of the vibration regarding the corner A of the object to be measured 21 as illustrated in FIG. 6B can be obtained. That is, in FIG. 6B, not only the vibration at the natural frequency of the primary natural vibration mode of the object to be measured 21 but also the vibration at the natural frequency of the higher order mode such as a secondary mode or a tertiary mode appear. As described above, since the vibration state of the object to be measured 21 in the higher order natural vibration mode can be obtained, the evaluation performance of the vibration state of the object to be measured 21 can be improved.

Figure 7A:
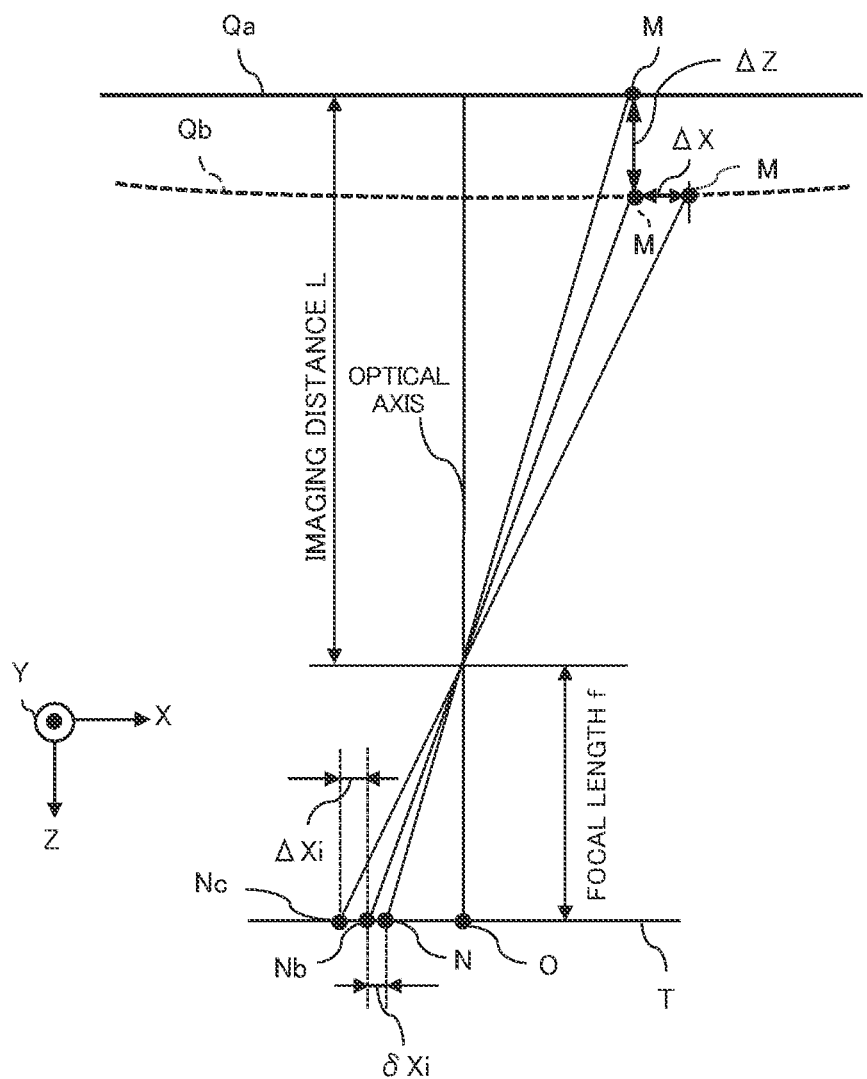
FIG. 7A is a diagram illustrating an optical arrangement on an XZ plane including an optical axis in capturing of the object to be measured.
Figure 7B:
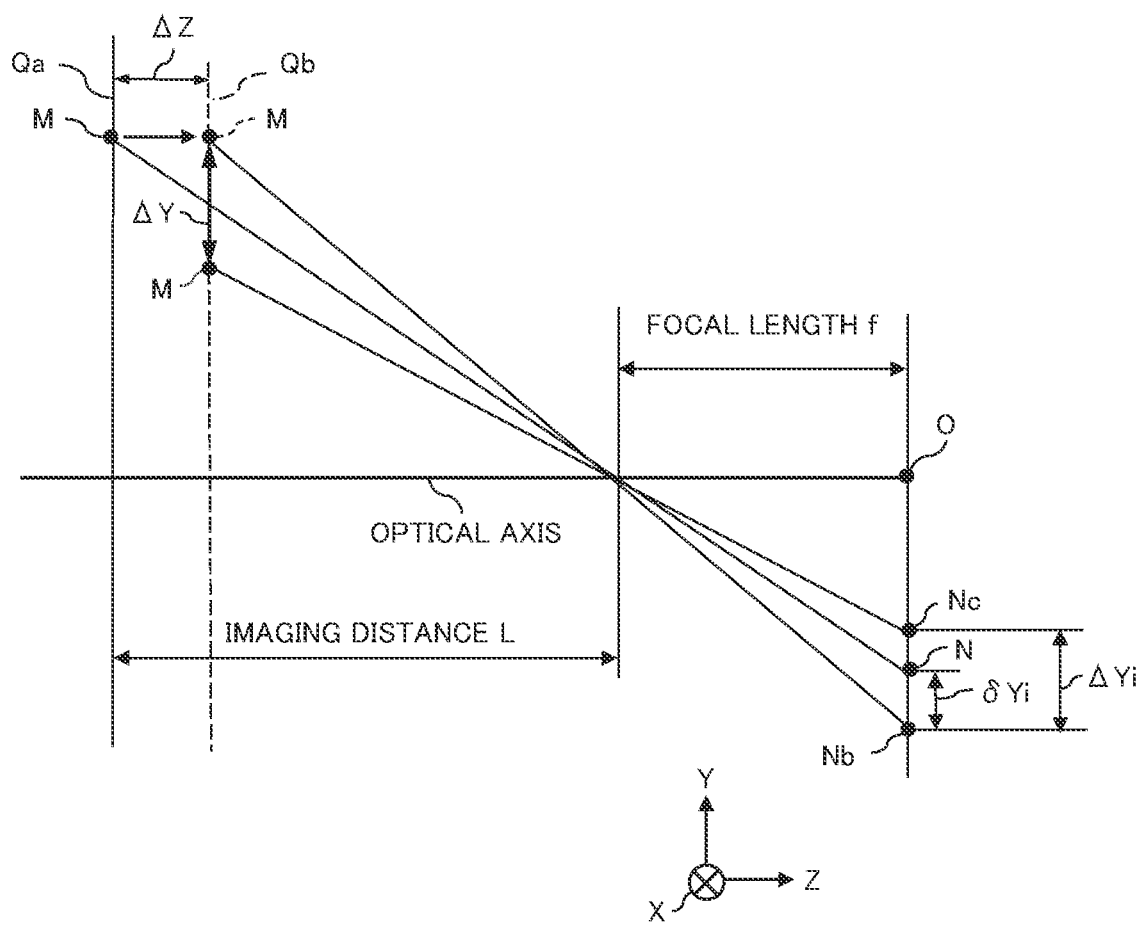
FIG. 7B is a diagram illustrating an optical arrangement on a YZ plane including the optical axis in capturing of the object to be measured.

Here, an optical system at the time of capturing the object to be measured by the capture device 1 will be described with reference to FIGS. 7A and 7B. In FIGS. 7A and 7B, an imaging plane T is orthogonal to the optical axis of the lens (not illustrated) of the capture device 1, a direction along the optical axis is a Z direction, and two directions orthogonal to the Z direction and parallel to the imaging plane T are an X direction and a Y direction. FIG. 7A illustrates an optical system on an XZ plane including the optical axis and extending along the X direction and the Z direction, and FIG. 7B illustrates an optical system on a YZ plane including the optical axis and extending along the Y direction and the Z direction. The coordinates representing the position on the imaging plane T are represented using a two-dimensional orthogonal coordinate system having an origin at an intersection point intersecting with the optical axis.

In FIGS. 7A and 7B, it is assumed that a point M on a surface Qa of the object to be measured 21 is imaged at a point N on the imaging plane T.

Here, a movement amount of the point M due to the movement of the surface Qa of the object to be measured 21 in the Z direction is defined as $\Delta z$. This movement amount is referred to as a depth movement amount. In the case where the point M moves in this manner, the image of the point M moves from the point N to the position of a point Nb on the imaging plane T. The movement amount due to such movement is hereinafter referred to as out-of-plane displacement.

In addition, the movement amount in the X direction from the point N to the point Nb is represented as δXi, and the movement amount in the Y direction from the point N to the point Nb is represented as δYi.

Meanwhile, it is assumed that distortion deformation of the surface Qa occurs due to the movement of the object to be measured 21. It is assumed that the point M on the surface Qa is displaced by ΔX and ΔY in the X direction and the Y direction due to the distortion. With this displacement, the image of the point M is captured at the position of the point Nc on the imaging plane T. The movement amount from the point Nb to the point Nc is hereinafter referred to as in-plane displacement. In addition, the movement amount in the X direction from the point Nb to the point Nc is represented as ΔXi, and the movement amount in the Y direction from the point Nb to the point Nc is represented as ΔYi.

In FIGS. 7A and 7B, the distance between a principal point of the lens and the surface Qa of the object to be measured 21 is defined as an imaging distance L, and the distance between the principal point of the lens and the imaging plane T is defined as a focal length f. Furthermore, on the imaging plane T, the distance in the X direction between the point N and the origin O is defined as X, and the distance in the Y direction between the point N and the origin O is defined as Y. In this case, a movement amount δXi in the X direction and a movement amount δYi in the Y direction of the out-of-plane displacement can be expressed by mathematical expression 1. Further, a movement amount ΔXi in the X direction and a movement amount ΔYi in the Y direction of the in-plane displacement can be expressed by mathematical expression 2.

$$\delta Xi = f \times \left(\frac{1}{L-\Delta Z} - \frac{1}{L}\right) \times X, \quad \text{(Mathematical expression 1)}$$

$$\delta Yi = f \times \left(\frac{1}{L-\Delta Z} - \frac{1}{L}\right) \times Y$$

$$\Delta Xi = \frac{f}{L-\Delta Z} \times \Delta X, \quad \Delta Yi = \frac{f}{L-\Delta Z} \times \Delta Y \quad \text{(Mathematical expression 2)}$$

The depth movement amount calculation unit 5 of the abnormality determination device 100 has a function to calculate the depth movement amount (in other words, out-of-plane displacement) of the object to be measured 10 as follows. A method of calculating the depth movement amount (out-of-plane displacement) will be described with reference to FIG. 8.

Figure 8:
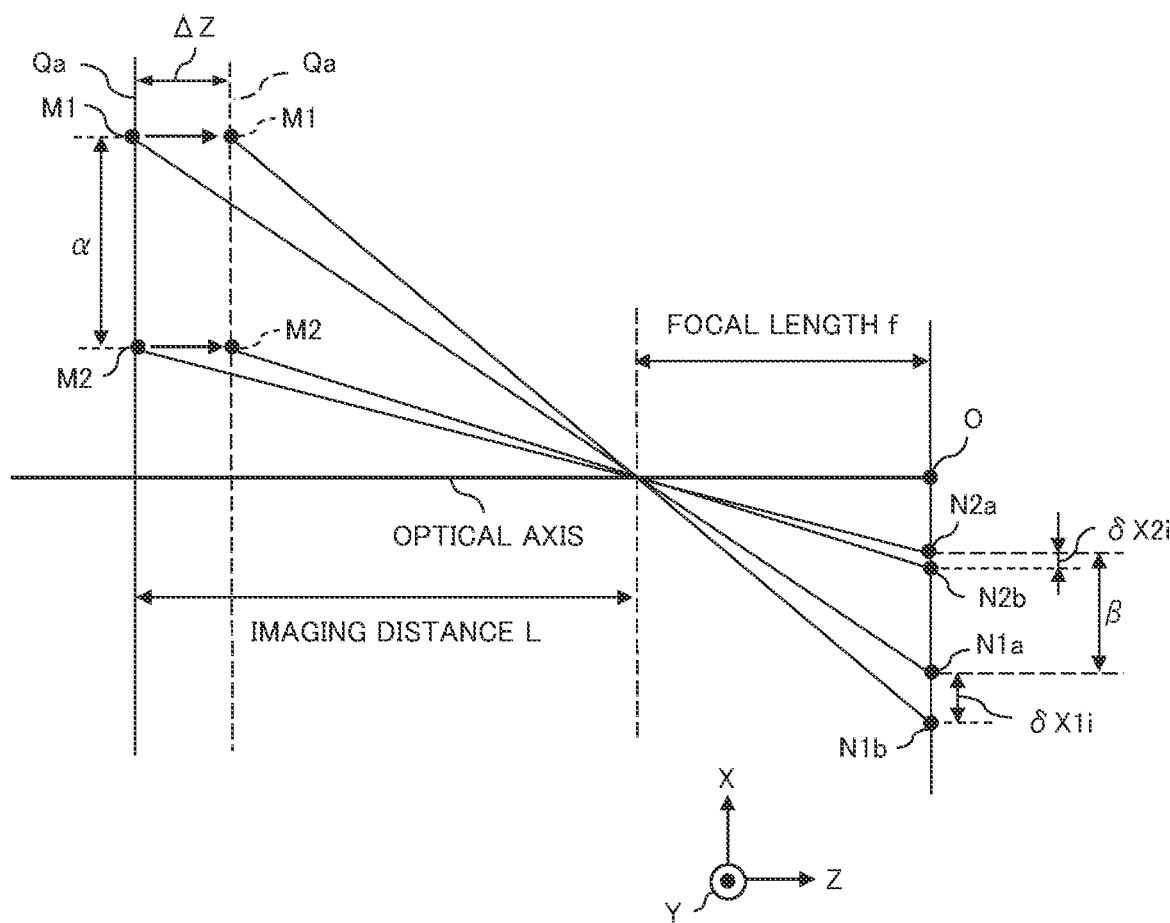
FIG. 8 is a diagram for describing an example of a method of calculating a depth movement amount.

As illustrated in FIG. 8, in a case where each of points M1 and M2 on the surface Qa of the object to be measured 21 moves by ΔZ in the Z direction along the optical axis of the capture device 1, the out-of-plane displacements of the points M1 and M2 are δX1i and δX2i. Here, the depth movement amount Δz is obtained from mathematical expression 4 using a difference δd between the out-of-plane displacements δX1i and δX2i expressed by mathematical expression 3 below. In the case where the distance between the points M1 and M2 on the surface Qa of the object to be measured 21 is α, the distance between an image N1a of the point M1 and an image N2a of the point M2 on the imaging plane T is β. β in mathematical expression 4 corresponds to the distance β between the images N1a and N2a. In addition, the distance α and the distance β has a relationship expressed in mathematical expression 5. Moreover, the difference δd is equivalent to a displacement characteristic in which the error component has been removed as illustrated in FIG. 5B, and is calculated by the displacement difference calculation unit 4. The depth movement amount calculation unit 5 calculates the depth movement amount Δz on the basis of mathematical expressions 3 and 4.

$$\delta d = \delta X2i - \delta X1i \quad \text{(Mathematical expression 3)}$$

$$\Delta Z = \delta d \times \frac{L}{\delta d + \beta} \quad \text{(Mathematical expression 4)}$$

$$\beta = \frac{\alpha \times f}{L} \quad \text{(Mathematical expression 5)}$$

Here, an out-of-plane displacement vector will be described with reference to FIGS. 9A to 9C.

Figure 9A:
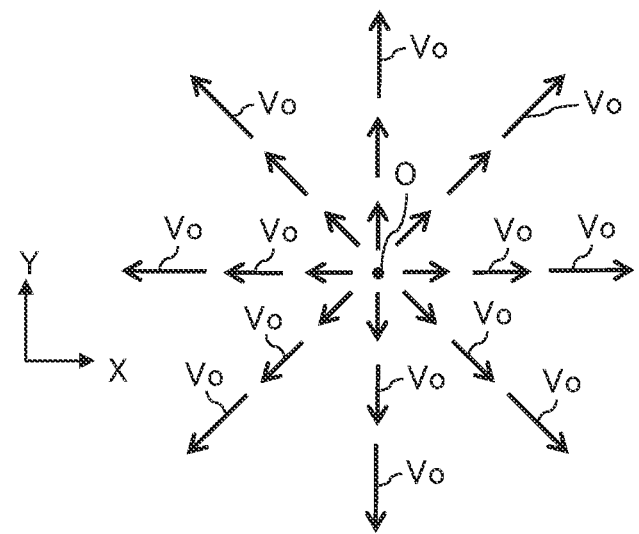
FIG. 9A is a diagram for describing an example of out-of-plane displacement vectors of the surface of the object to be measured in a captured image.
Figure 9B:
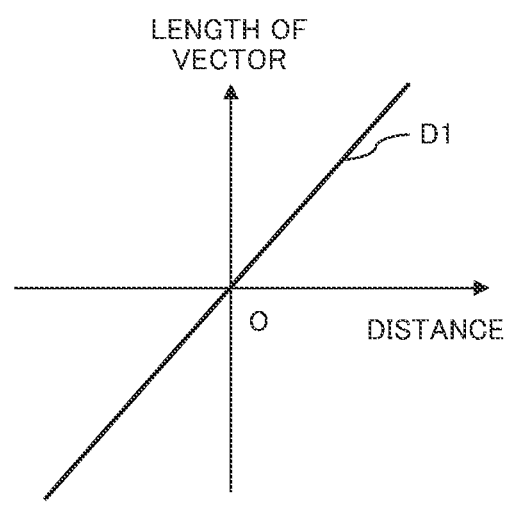
FIG. 9B is a graph illustrating an example of a relationship between the length of the out-of-plane displacement vector and the distance from an imaging center.
Figure 9C:
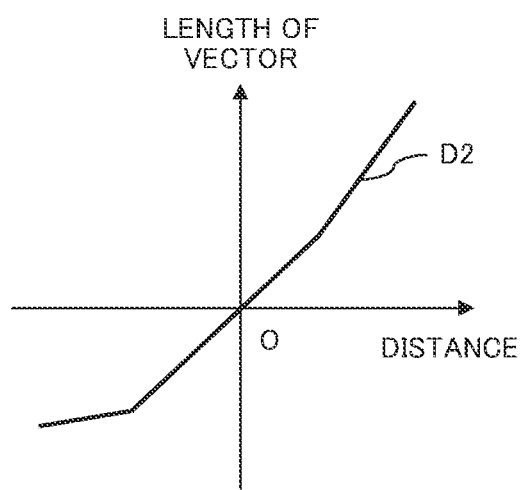
FIG. 9C is a graph illustrating another example of the relationship between the length of the out-of-plane displacement vector and the distance from the imaging center.

In the case where the surface Qa of the object to be measured 21 uniformly moves by ΔZ in the Z direction along the optical axis of the capture device 1 as illustrated in FIG. 7A, out-of-plane displacement vectors Vo on the imaging plane T are a group of radial vectors centered on the intersection point O (in other words, the imaging center) with the optical axis of the capture device 1 as illustrated in FIG. 9A. In such an out-of-plane displacement vector Vo, the length of the out-of-plane displacement vector Vo on the imaging plane T increases in proportion to the distance from the imaging center O (see mathematical expression 1). In such a case, for example, the relationship between the distance in the X direction from the imaging center O and the length of the out-of-plane displacement vector is a relationship as in a straight line D1 illustrated in the graph of FIG. 9B, and the inclination of the straight line D1 corresponds to the depth movement amount ΔZ. By the way, as indicated by a line D2 in the graph of FIG. 9C, in a case where the inclination of the line D2 varies depending on a section, the depth movement amount ΔZ varies for each section. In such a case, for example, the out-of-plane displacement is calculated using mathematical expression 1 for each section from mathematical expression 1.

The depth movement amount calculation unit 5 can also calculate the depth movement amount Δz (out-of-plane displacement) as described above. Note that the depth movement amount calculation unit 5 may calculate the depth movement amount by performing linear regression calculation for the displacements illustrated in FIGS. 10B and 10C in addition to the method based on mathematical expressions 4 and 5.

Figure 10A:
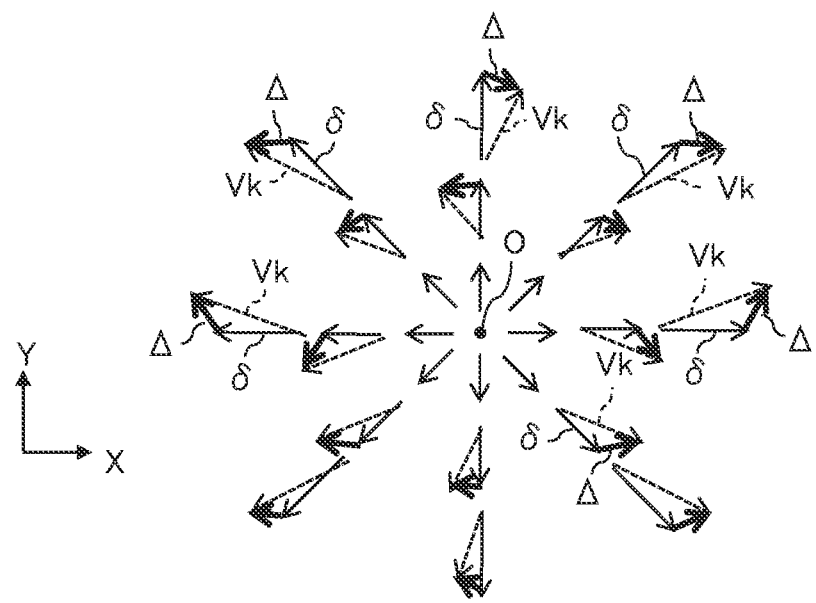
FIG. 10A is a diagram illustrating a relationship between out-of-plane displacement vectors and in-plane displacement vectors of the surface of the object to be measured in a captured image.
Figure 10B:
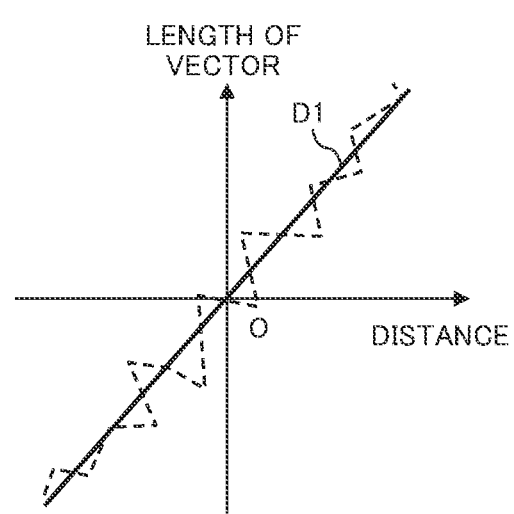
FIG. 10B is a graph illustrating an example of a relationship between the length of the out-of-plane displacement vector and the distance from the imaging center.
Figure 10C:
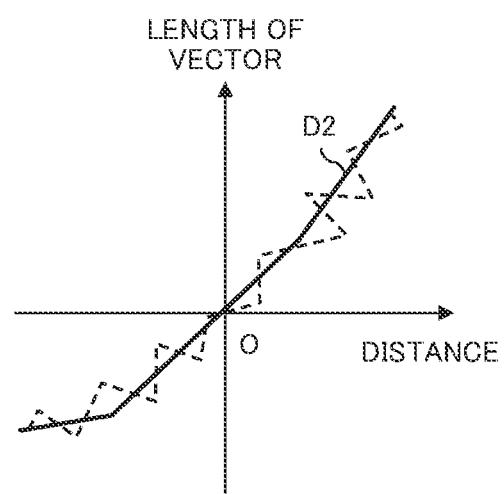
FIG. 10C is a graph illustrating still another example of the relationship between the length of the out-of-plane displacement vector and the distance from the imaging center.

The displacement separation unit 6 has a function to calculate the in-plane displacement. FIGS. 10A to 10C are diagrams for describing a relationship between out-of-plane displacement vectors and in-plane displacement vectors. In FIG. 10A, a dotted line Vk represents the displacement amount (hereinafter referred to as a measurement vector Vk(Vx$_i$, Vy$_i$)) in the coordinate-fixed time-series image. The measurement vector Vk(Vx$_i$, Vy$_i$) is a synthetic vector of the out-of-plane displacement vector δ(δx$_i$, δy$_i$) and the in-plane displacement vector Δ(Δx$_i$, Δy$_i$).

The solid lines D1 and D2 illustrated in FIGS. 10B and 10C represent X components of the out-of-plane displacement vectors δ, and when the X component of the in-plane displacement vector Δ is added thereto, the X components of the measurement vectors Vk as indicated by the dotted lines are obtained. In a case where the magnitude of the in-plane displacement is sufficiently smaller than the magnitude of the out-of-plane displacement, ΔZ obtained by mathematical expression 4 in which the in-plane displacement is not considered can be approximated to the depth movement amount. For this reason, the out-of-plane displacement is obtained by substituting ΔZ in mathematical expression 1 for each section having a different inclination of the line D2 in FIG. 10C.

Meanwhile, the displacement separation unit 6 separates the X component of the in-plane displacement vector Δ from the measurement vector Vk by subtracting the X component of the out-of-plane displacement vector δ from the X component of the measurement vector Vk at each point in each section calculated by the displacement difference calculation unit 4. Note that, in the above specific example, the method of calculating the in-plane displacement of the image in the X direction in the coordinate-fixed time-series image has been described, but the in-plane displacements in the Z direction and the Y direction can also be calculated by a similar method.

The determination unit 7 has a function to detect an abnormality of the object to be measured 21 on the basis of a temporal change in displacement of the surface of the object to be measured 21. In this example, the determination unit 7 includes the three-dimensional spatial distribution information analysis unit 8 and the temporal change information analysis unit 9. The three-dimensional spatial distribution information analysis unit 8 has a function to analyze a three-dimensional displacement distribution of the object to be measured 21 at a time point of attention. The temporal change information analysis unit 9 has a function to analyze a temporal change in three-dimensional displacement in a portion of attention on the surface of the object to be measured 21.

Figure 11A:
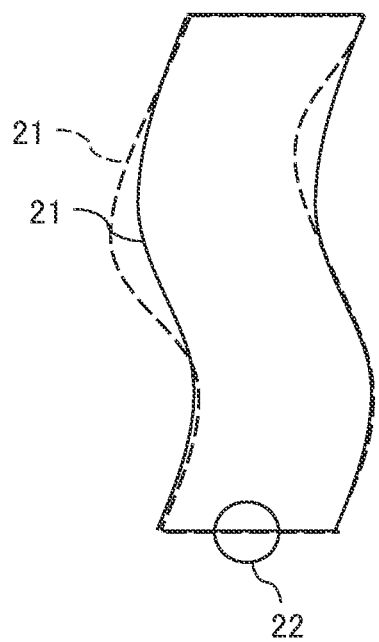
FIG. 11A is a diagram for describing a state of natural vibration of the object to be measured.

Here, the natural vibration of the object to be measured 21 will be described. In FIG. 11A, in the case where the object to be measured (propeller-like blade) 21 is rotating about the rotation shaft 22, a state where the object to be measured 21 normally vibrates naturally is illustrated by the solid line, and a state where an abnormality has occurred in the vibration of the object to be measured 21 is illustrated by the dotted line. In this example, the object to be measured 21 is a steel-made blade having the size of 700 mm (mm) in length, 150 mm in width, and 3 mm in thickness, and rotates at 200 rotations per minute (rpm).

Figure 11B:
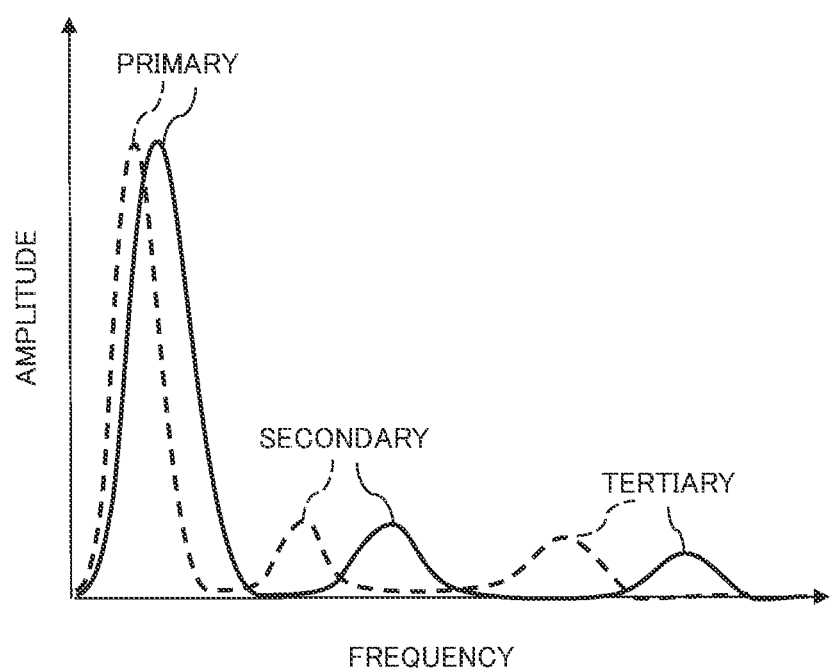
FIG. 11B is a diagram for describing frequency characteristics of natural vibration of the object to be measured.

It is assumed that such the surface of the blade of the object to be measured 21 is captured by the capture device 1, and displacement (that is, out-of-plane displacement) in a direction in which the blade of the object to be measured 21 approaches or moves away from the capture device 1 is calculated by the depth movement amount calculation unit 5. In consideration of the above, FIG. 11B illustrates the frequency characteristic of the out-of-plane displacement due to the natural vibration of the object to be measured 21. In the case where the object to be measured 21 normally performs natural vibration, the object to be measured has the frequency characteristic of vibration as illustrated by the solid line in FIG. 11B, and the primary, secondary, and tertiary natural frequencies are 10 Hz, 50 Hz, and 150 Hz, respectively. The natural frequency of the object to be measured 21 during such normal vibration is stored in advance in a storage device provided in the abnormality determination device 100.

In contrast, in a case where an abnormal portion such as an internal cavity is present in the object to be measured 21 and thus an abnormality occurs in the vibration of the object to be measured 21, the object to be measured 21 has a frequency characteristic of vibration as illustrated by the dotted line in FIG. 11B and has a frequency characteristic different from the normal time. As illustrated in FIG. 11B, the primary, secondary, and tertiary natural frequencies of the object to be measured 21 in the abnormal vibration state tend to be lower than those in the normal time.

As described above, since the frequency characteristic of the vibration of the out-of-plane displacement of the object to be measured 21 is different between the normal time and the abnormal time, the abnormality of the object to be measured 21 can be detected by using the frequency characteristics. In consideration of this characteristic, to detect the vibration state of the out-of-plane displacement of the object to be measured 21, in the first example embodiment, the frame rate of the moving image of the capture device 1 is set to 400 fps, which is twice or more the tertiary natural frequency of 150 Hz, in view of the sampling theorem. As described above, the frame rate may be appropriately set in consideration of the frequency characteristic of the vibration of the object to be measured, and is not limited to 400 fps.

Note that the resolution of 0.1 mm per pixel is implemented in a state where the imaging distance is 5 m, the focal length of the lens of the capture device is 200 mm, and a pixel pitch is 4 μm. Here, the displacement calculation unit 3 interpolates the displacement up to ¹⁄₁₀₀ pixels by using the quadratic curve interpolation method in the image correlation calculation described above, whereby the displacement measurement resolution of 1 μm is implemented.

Figure 12A:
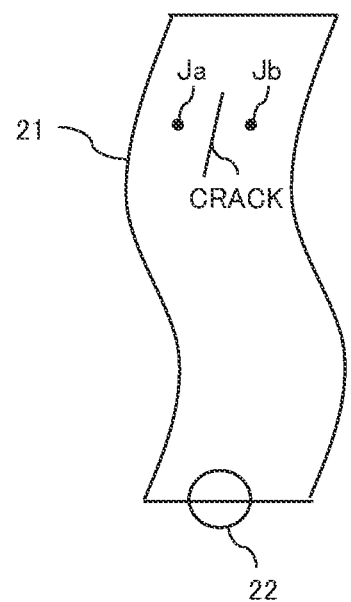
FIG. 12A is a diagram for describing in-plane displacement in a case where there is a crack in the surface of the object to be measured, together with FIG. 12B.
Figure 12B:
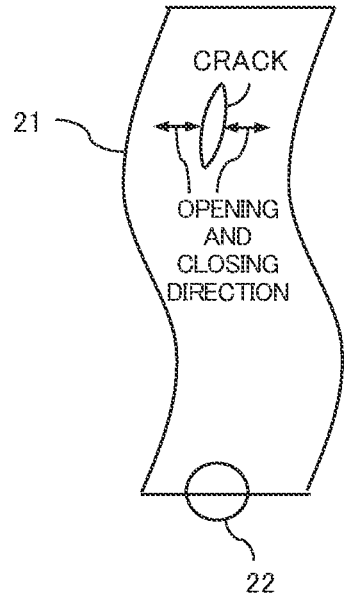
FIG. 12B is a diagram for describing in-plane displacement in a case where there is a crack in the surface of the object to be measured, together with FIG. 12A.

Next, the in-plane displacement in a case where a crack is generated as illustrated in FIG. 12A in the above-described surface of the object to be measured (propeller-like blade) 21 will be described. In the case where a crack is generated in the surface of the object to be measured 21, as illustrated in FIG. 12B, an opening in the surface of the object to be measured 21 due to the crack opens and closes according to a rotational motion of the object to be measured 21. The in-plane displacement occurs in the surface of the object to be measured 21 by the opening and closing of the opening due to the crack.

Figure 12C:
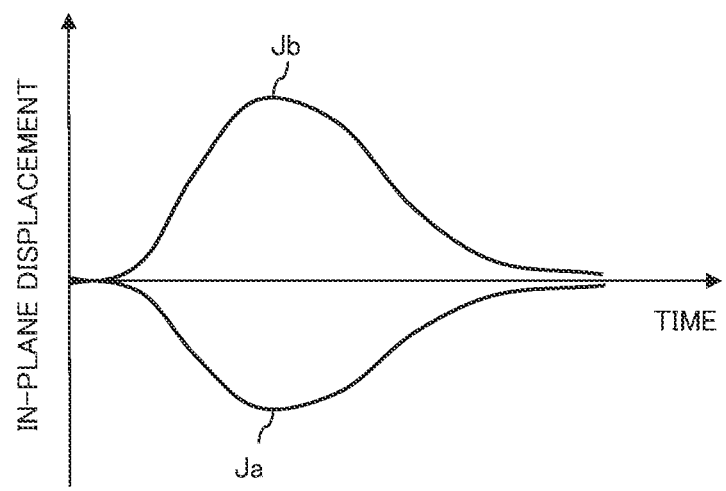
FIG. 12C is a graph illustrating an example of a temporal change in in-plane displacement in the case where there is a crack in the surface of the object to be measured.
Figure 12D:
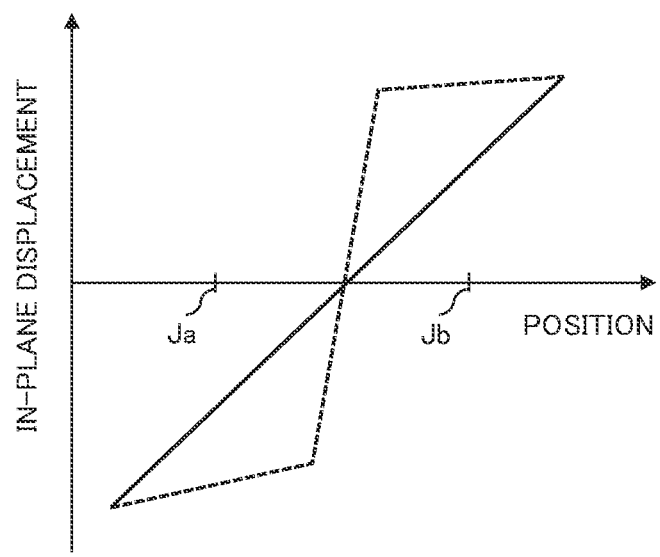
FIG. 12D is a diagram for describing an example of a relationship between the distance (position) from the crack and in-plane displacement in the case where there is a crack in the surface of the object to be measured.

FIG. 12C is a graph illustrating the temporal change in the in-plane displacement at points Ja and Jb, and FIG. 12D is a graph illustrating an in-plane displacement distribution on a straight line passing through the points Ja and Jb. In a case where there is no crack in the surface of the object to be measured 21, the spatial in-plane displacement distribution is continuous as illustrated by the solid line in FIG. 12D. On the other hand, in the case where there is a crack, the spatial in-plane displacement distribution exhibits a rapid intermittent change between the points Ja and Jb, as illustrated by the dotted line in FIG. 12D.

Therefore, the abnormality of the object to be measured 21 caused by a crack or the like in the surface of the object to be measured 21 can be detected on the basis of such a temporal change in the in-plane displacement or a spatial in-plane displacement distribution.

In consideration of the above, the three-dimensional spatial distribution information analysis unit 8 of the determination unit 7 analyzes the three-dimensional displacement distribution of the object to be measured at a plurality of time points of attention. Further, the temporal change information analysis unit 9 analyzes temporal changes in three-dimensional displacements in a plurality of portions on the surface of the object to be measured. The determination unit 7 determines the abnormality of the object to be measured 21 on the basis of information obtained by the three-dimensional spatial distribution information analysis unit 8 and the temporal change information analysis unit 9. This determination result is output to, for example, a notification device. The notification device visually notifies the determination result by, for example, screen display or audibly notifies the determination result by a speaker or the like. Moreover, the information output by the notification device may be information in a form read by a machine in addition to the information in a form visually and aurally recognizable by a person. In the above example, the determination unit 7 determines the abnormality of the object to be measured 21 using both the depth movement amount and the in-plane displacement. In contrast, the determination unit 7 may determine the abnormality of the object to be measured 21 using one of the depth movement amount or the in-plane displacement.

Figure 13:
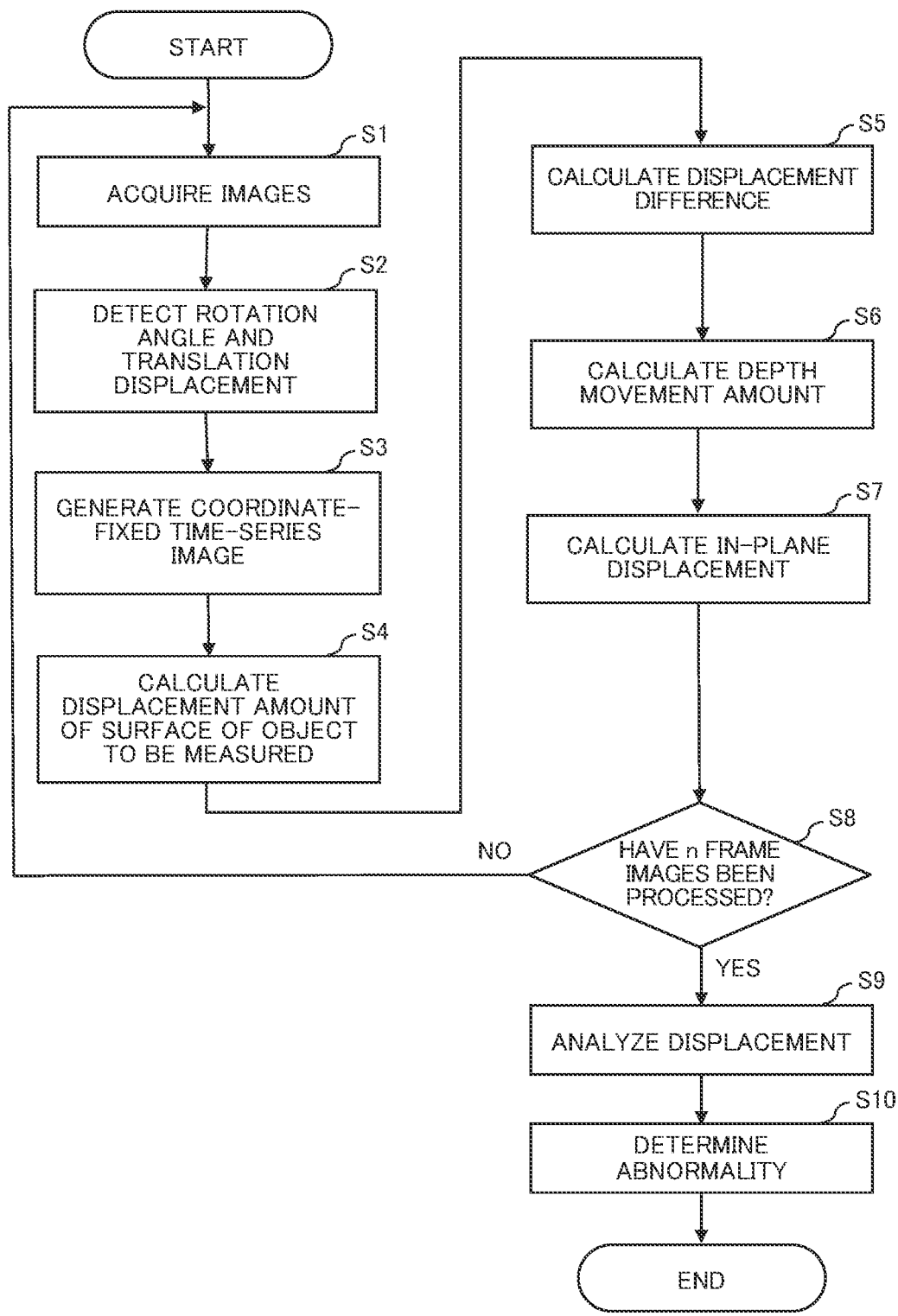
FIG. 13 is a flowchart illustrating an example of abnormality determination processing executed by the abnormality determination device.

Next, an example of an operation flow of the abnormality determination device 100 will be described with reference to FIG. 13. FIG. 13 is a flowchart illustrating an example of the abnormality determination processing executed by the abnormality determination device 100.

First, the abnormality determination device 100 acquires the time-series images in which the surface of the object to be measured 10 (21) is captured from the capture device 1 (S1). Thereafter, the coordinate system fixing unit 2 calculates the displacement amount in the surface of the object to be measured 10 using a set of mth (m>1) and (m+1)th frame images included in the time-series images. Further, the coordinate system fixing unit 2 detects a rotation angle and translational displacement between the mth and (m+1)th frame images by rotation template matching, using the calculated displacement amount (S2). Moreover, the coordinate system fixing unit 2 generates the coordinate-fixed time-series image by reversely rotating the (m+1)th frame image by the detected rotation angle or reversely displacing the (m+1)th frame image by the translational displacement (S3). Thereafter, the displacement calculation unit 3 calculates the displacement amount of the surface of the object to be measured in the coordinate-fixed time-series image (S4).

Then, the displacement difference calculation unit 4 calculates a displacement difference (that is, two-dimensional displacement difference distribution) by subtracting the displacement amount selected as a reference in the coordinate-fixed time-series image from the displacement amount calculated in the same coordinate-fixed time-series image (S5).

Thereafter, the depth movement amount calculation unit 5 calculates the depth movement amount (out-of-plane displacement) from the displacement difference obtained by the displacement difference calculation unit 4 (S6). Further, the displacement separation unit 6 calculates the in-plane displacement by subtracting the depth movement amount obtained by the depth movement amount calculation unit 5 from the displacement difference obtained by the displacement difference calculation unit 4 (S7).

After that, the coordinate system fixing unit 2 determines whether the depth movement amount and the in-plane displacement have been calculated for predetermined n (>1) frame images included in the time-series images (S8). In a case where the processing of calculating the depth movement amount and the in-plane displacement has not been completed for the n frame images (No in S8), the processing returns to step S1, and the coordinate system fixing unit 2 generates the coordinate-fixed time-series image by using the next set of frame images included in the time-series images, that is, the (m+1)th and (m+2)th frame images.

On the other hand, in step S8, in a case where the coordinate system fixing unit 2 determines that the processing of calculating the depth movement amount and the in-plane displacement has been completed for the n frame images (Yes in S8), the determination unit 7 executes the determination processing. That is, the determination unit 7 analyzes the calculated depth movement amount and in-plane displacement (S9), and determines the abnormality of the object to be measured 10 using the analysis result (S10). After the abnormality determination, the abnormality determination device 100 may output the determination result to the notification device. By the notification of the notification device, the user can determine whether it is necessary to repair or precisely examine the object to be measured 10, for example.

In this manner, the abnormality determination device 100 executes the abnormality determination processing.

According to the configuration of the first example embodiment, it is possible to accurately determine the abnormality of the moving object using the captured image of the single capture device without using a stereo camera, that is, while suppressing the increase in size and cost of the device.

Second Example Embodiment

Hereinafter, a second example embodiment according to the present invention will be described. In the description of the second example embodiment, the same reference numerals are given to the same components as those of the abnormality determination device and the like of the first example embodiment, and redundant description of common parts will be omitted.

Figure 14:
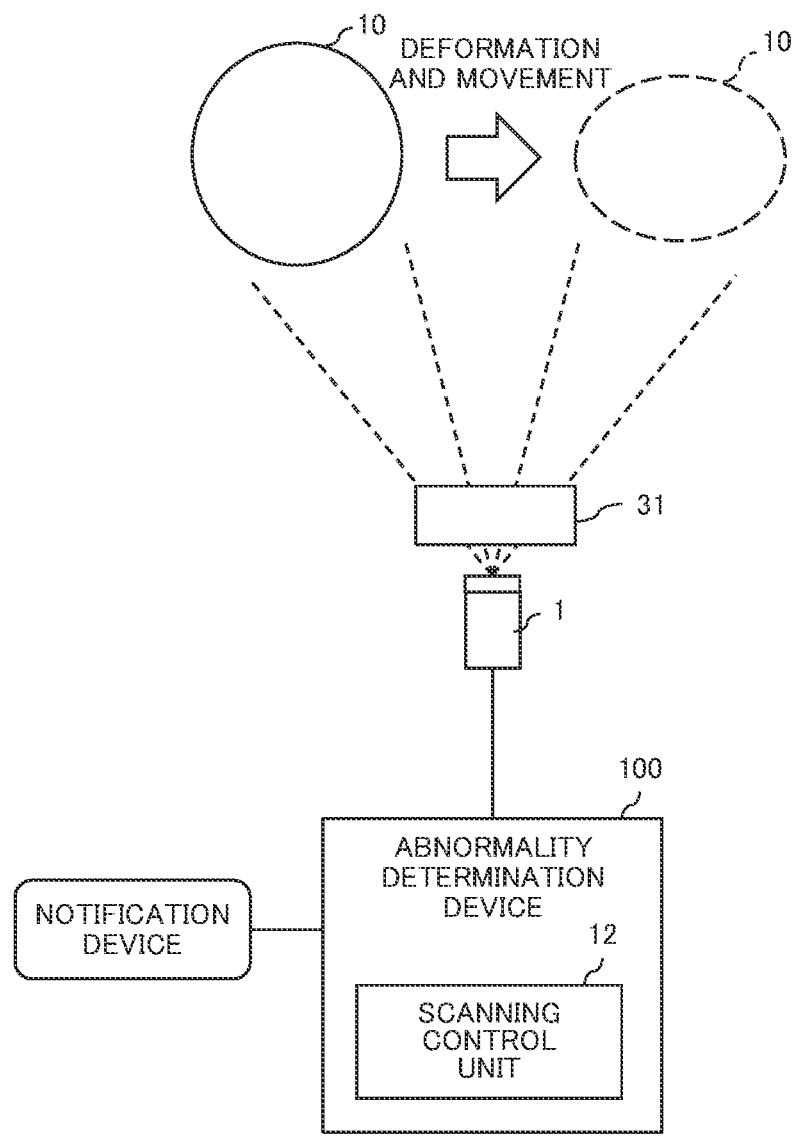
FIG. 14 is a diagram illustrating a functional configuration of an abnormality determination device according to a second example embodiment of the present invention.

FIG. 14 is a diagram illustrating a functional configuration of an abnormality determination device according to the second example embodiment; In the second example embodiment, a scanning device 31 that changes a capture direction of a capture device 1 is provided, and an abnormality determination device 100 includes a scanning control unit 12 in addition to the configuration of the first example embodiment. The scanning control unit 12 is implemented by a CPU. The scanning control unit 12 controls the scanning device 31 so that the capture direction of the capture device 1 changes according to movement of an object to be measured 10. Specifically, for example, the scanning control unit 12 acquires angle information and the like obtained when a displacement calculation unit 3 generates coordinate-fixed time-series images, generates information of a movement amount in the capture direction on the basis of the acquired information, and outputs the information to the scanning device 31. The scanning device 31 changes the capture direction of the capture device 1 using the information from the scanning control unit 12.

The configuration of the second example embodiment other than the above is similar to the configuration of the first example embodiment, and description thereof will be omitted here.

Since the second example embodiment has similar configurations to those of the first example embodiment, similar effects to those of the first example embodiment can be obtained. In addition, since the abnormality determination device 100 of the second example embodiment includes the scanning control unit 12, the object to be measured 10 during motion is tracked and captured by the capture device 1. As a result, even in a case where the object to be measured 10 moves to a range equal to or larger than a visual field of the capture device 1, the object to be measured 10 can be continuously observed without interruption, and the abnormality determination device 100 can also perform abnormality determination of the object to be measured 10 moving to a wide region with high accuracy.

Note that the scanning device 31 may have a structure using, for example, a biaxial galvanometer scanner, a polygon scanner, or the like, or may have a configuration using an element using an electro-optical effect.

<Hardware Configuration>

Figure 15:
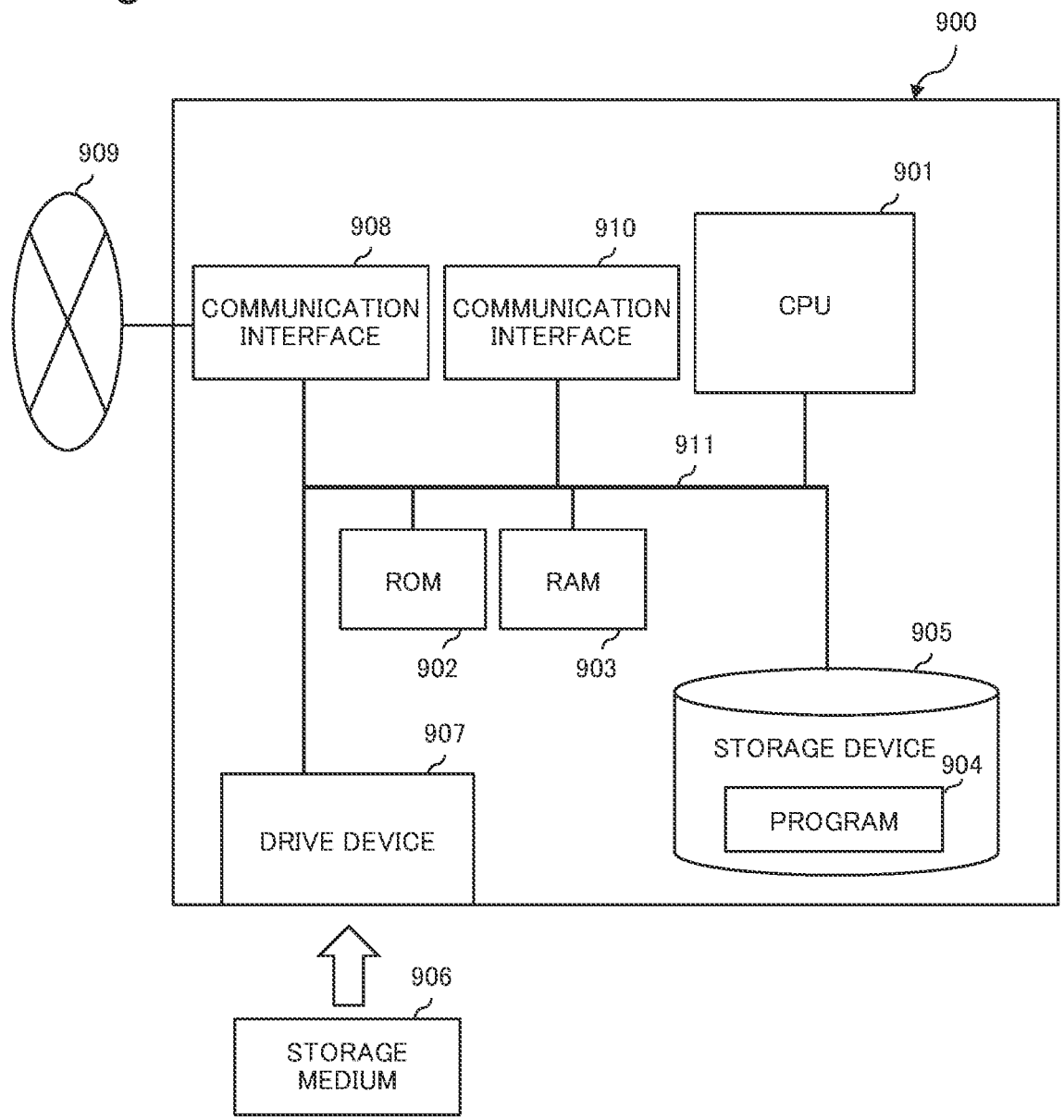
FIG. 15 is a block diagram illustrating a hardware configuration example of the abnormality determination device.

FIG. 15 is a block diagram illustrating a hardware configuration example of the abnormality determination device 100 in the first or second example embodiment.

As illustrated in FIG. 15, a signal processing device 900 configuring the abnormality determination device 100 includes the following configurations as an example:

a central processing unit (CPU) 901;
a read only memory (ROM) 902;
a random access memory (RAM) 903;
a program 904 loaded to the RAM 903;
a storage device 905 that stores the program 904;
a drive device 907 that performs read and write to a storage medium 906;
a communication interface 908 connected to a communication network 909;
an input/output interface 910 that inputs/outputs data; and
a bus 911 connecting the configuration elements.

The functional units of the abnormality determination device 100 according to the first or second example embodiments are implemented by the CPU 901 acquiring and executing the program 904 that implements these functions. The program 904 is stored in advance in the storage device 905 or the ROM 902, for example, and is loaded to the RAM 903 and executed by the CPU 901 as necessary. Note that the program 904 may be supplied to the CPU 901 via the communication network 909, or may be stored in advance in the storage medium 906 and the drive device 907 may read the program and supply the program to the CPU 901.

The present invention has been described above using the first and second example embodiments as exemplary examples. However, the present invention is not limited to the above-described example embodiments. That is, various aspects that will be understood by those of ordinary skill in the art can be applied without departing from the scope of the present invention as defined by the claims.

REFERENCE SIGNS LIST 1 capture device
2 coordinate system fixing unit
3 displacement calculation unit
4 displacement difference calculation unit
5 depth movement amount calculation unit
6 displacement separation unit
7 determination unit
8 three-dimensional spatial distribution information analysis unit
9 temporal change information analysis unit
10 object to be measured
31 scanning device
100 abnormality determination device

What is claimed is:

1. An abnormality determination device comprising:
at least one processor configured to:
generate coordinate-fixed time-series images by changing directions of a plurality of captured images in a direction in which reference points in the plurality of captured images coincide with each other, the plurality of captured images being included in time-series images, the time-series images being images in which a surface of an object to be measured is captured with passage of time, the reference points being determined based on an image of the surface of the object to be measured, the coordinate-fixed time-series images being images in which positions and directions of images of the surface of the object to be measured in the plurality of captured images are aligned;
calculate a two-dimensional spatial distribution of displacements of the surface of the object to be measured from the coordinate-fixed time-series images;
calculate a two-dimensional displacement difference distribution representing differences between the displacements of the surface of the object to be measured in the calculated two-dimensional spatial distribution and a displacement selected as a reference from the displacements of the surface of the object to be measured in the two-dimensional spatial distribution;
calculate, as a depth movement amount, a movement amount of the surface of the object to be measured in a normal direction orthogonal to the image of the surface of the object to be measured from the two-dimensional displacement difference distribution;
calculate a displacement amount on the surface of the object to be measured as an in-plane displacement by subtracting the depth movement amount from the two-dimensional displacement difference distribution; and
determine an abnormality of the object to be measured using one or both of the in-plane displacement and the depth movement amount.

2. The abnormality determination device according to claim 1, wherein the at least one processor determines the abnormality of the object to be measured based on a temporal change in the in-plane displacement.

3. The abnormality determination device according to claim 1, wherein the at least one processor determines the abnormality of the object to be measured based on a temporal change in the depth movement amount.

4. The abnormality determination device according to claim 1, wherein the at least one processor controls a scanning means having a function to change a capture direction of a capture device that captures the surface of the object to be measured in such a way that the capture direction of the capture device changes according to movement of the object to be measured.

5. An abnormality determination method comprising:
by a computer,
generating coordinate-fixed time-series images by changing directions of a plurality of captured images in a direction in which reference points in the plurality of captured images coincide with each other, the plurality of captured images being included in time-series images, the time-series images being images in which a surface of an object to be measured is captured with passage of time, the reference points being determined based on an image of the surface of the object to be measured, the coordinate-fixed time-series images being images in which positions and directions of images of the surface of the object to be measured in the plurality of captured images are aligned;
calculating a two-dimensional spatial distribution of displacements of the surface of the object to be measured from the coordinate-fixed time-series images;
calculating a two-dimensional displacement difference distribution representing differences between the displacements of the surface of the object to be measured in the calculated two-dimensional spatial distribution and a displacement selected as a reference from the displacements of the surface of the object to be measured in the two-dimensional spatial distribution;
calculating, as a depth movement amount, a movement amount of the surface of the object to be measured in a normal direction orthogonal to the image of the surface of the object to be measured from the two-dimensional displacement difference distribution;

calculating a displacement amount on the surface of the object to be measured as an in-plane displacement by subtracting the depth movement amount from the two-dimensional displacement difference distribution; and determining an abnormality of the object to be measured using one or both of the in-plane displacement and the depth movement amount.

6. A non-transitory program storage medium storing a computer program for causing a computer to execute:

processing of generating coordinate-fixed time-series images by changing directions of a plurality of captured images in a direction in which reference points in the plurality of captured images coincide with each other, the plurality of captured images being included in time-series images, the time-series images being images in which a surface of an object to be measured is captured with passage of time, the reference points being determined based on an image of the surface of the object to be measured, the coordinate-fixed time-series images being images in which positions and directions of images of the surface of the object to be measured in the plurality of captured images are aligned;

processing of calculating a two-dimensional spatial distribution of displacements of the surface of the object to be measured from the coordinate-fixed time-series images;

processing of calculating a two-dimensional displacement difference distribution representing differences between the displacements of the surface of the object to be measured in the calculated two-dimensional spatial distribution and a displacement selected as a reference from the displacements of the surface of the object to be measured in the two-dimensional spatial distribution;

processing of calculating, as a depth movement amount, a movement amount of the surface of the object to be measured in a normal direction orthogonal to the image of the surface of the object to be measured from the two-dimensional displacement difference distribution;

processing of calculating a displacement amount on the surface of the object to be measured as an in-plane displacement by subtracting the depth movement amount from the two-dimensional displacement difference distribution; and processing of determining an abnormality of the object to be measured using one or both of the in-plane displacement and the depth movement amount.

* * * * *